United States Patent
Ortiz et al.

(10) Patent No.: US 11,615,414 B2
(45) Date of Patent: Mar. 28, 2023

(54) VIRTUALIZATION AND SECURE PROCESSING OF DATA

(71) Applicant: ROYAL BANK OF CANADA, Toronto (CA)

(72) Inventors: Edison U. Ortiz, Orlando, FL (US); Terry W. Lee, Toronto (CA); Linda Mantia, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 346 days.

(21) Appl. No.: 17/080,197

(22) Filed: Oct. 26, 2020

(65) Prior Publication Data

US 2021/0065176 A1    Mar. 4, 2021

Related U.S. Application Data

(63) Continuation of application No. 14/705,477, filed on May 6, 2015, now Pat. No. 10,846,692, which is a (Continued)

(51) Int. Cl.
*G06Q 20/40* (2012.01)
*G06Q 20/32* (2012.01)
(Continued)

(52) U.S. Cl.
CPC ........... *G06Q 20/40* (2013.01); *G06Q 20/322* (2013.01); *G06Q 20/3221* (2013.01); (Continued)

(58) Field of Classification Search
CPC .. G06Q 20/40; G06Q 20/322; G06Q 20/3221; G06Q 20/3223; G06Q 20/3278; (Continued)

(56) References Cited

U.S. PATENT DOCUMENTS 9,177,313 B1   11/2015   Silverman
9,336,519 B2   5/2016    Young
(Continued)

FOREIGN PATENT DOCUMENTS

EP    2587432 A1    5/2013

OTHER PUBLICATIONS

Lampropoulos et al. "Identity Management Directions in Future Internet", IEEE Communications Magazine, Dec. 2011, pp. 74-83 (Year: 2011).*

(Continued)

*Primary Examiner* — James D Nigh
(74) *Attorney, Agent, or Firm* — Norton Rose Fulbright Canada LLP

(57) ABSTRACT

Systems, methods, and non-transient machine-interpretable data representing executable instruction sets and/or other products for the processing of data for the 5 secure creation, administration, manipulation, processing, and storage of electronic data useful in the processing of payment transactions and other secure data processes. In various aspects and embodiments the disclosure provides secure means for the authorization of sensitive and other data processes subject to controlled access. Such processes include, for example the creation, administration, 10 authorization, virtualization, storage, and other manipulation or processing of electronic data representing characteristics of, instructions for, and information associated with consumer, business, and other payment accounts, and other forms of secure payment elements, such as payment tokens; and data useful in processing transactions using such accounts and elements. Information associated with 15 particular payment means, such as accounts or payment tokens, can be stored, for example, in a data set, usually secure, sometimes referred to as a virtual or electronic wallet, or a secure payment token.

21 Claims, 20 Drawing Sheets

Related U.S. Application Data continuation of application No. 14/287,134, filed on May 26, 2014, now abandoned, which is a continuation of application No. 14/056,440, filed on Oct. 17, 2013, now Pat. No. 9,082,119, said application No. 14/705,477 is a continuation of application No. 14/056,440, filed on Oct. 17, 2013, now Pat. No. 9,082,119.

(60) Provisional application No. 61/863,593, filed on Aug. 8, 2013, provisional application No. 61/833,188, filed on Jun. 10, 2013, provisional application No. 61/825,865, filed on May 21, 2013, provisional application No. 61/811,783, filed on Apr. 14, 2013, provisional application No. 61/715,142, filed on Oct. 17, 2012.

(51) Int. Cl.
  *G06Q 20/36* (2012.01)
  *G06Q 20/38* (2012.01)

(52) U.S. Cl.
  CPC ..... *G06Q 20/3223* (2013.01); *G06Q 20/3278* (2013.01); *G06Q 20/36* (2013.01); *G06Q 20/385* (2013.01); *G06Q 20/3823* (2013.01); *G06Q 20/3829* (2013.01); *G06Q 20/38215* (2013.01); *G06Q 20/367* (2013.01); *G06Q 20/3672* (2013.01); *G06Q 2220/00* (2013.01)

(58) Field of Classification Search
  CPC ............. G06Q 20/36; G06Q 20/38215; G06Q 20/3823; G06Q 20/3829; G06Q 20/385; G06Q 20/367; G06Q 20/3672
  USPC .......................................................... 705/71
  See application file for complete search history.

(56) References Cited

U.S. PATENT DOCUMENTS

| | | | |
|---|---|---|---|
| 11,232,456 B2 | 1/2022 | Hyun | |
| 2008/0072064 A1 | 3/2008 | Franchi | |
| 2008/0133350 A1 | 6/2008 | White | |
| 2009/0064294 A1 | 3/2009 | Cook | |
| 2009/0254440 A1 | 10/2009 | Pharris | |
| 2010/0241867 A1 | 9/2010 | Brown | |
| 2011/0225090 A1* | 9/2011 | Hammad | G06Q 20/405 705/44 |
| 2012/0036042 A1 | 2/2012 | Graylin | |
| 2012/0197797 A1 | 8/2012 | Grigg | |
| 2012/0209657 A1 | 8/2012 | Connolly | |
| 2012/0290376 A1 | 11/2012 | Dryer | |
| 2013/0124346 A1 | 5/2013 | Baldwin et al. | |
| 2013/0179352 A1 | 7/2013 | Dwyre | |
| 2013/0214898 A1 | 8/2013 | Pineau et al. | |
| 2013/0218769 A1* | 8/2013 | Pourfallah | G06Q 20/10 705/44 |
| 2013/0238455 A1 | 9/2013 | Laracey | |
| 2013/0268687 A1 | 10/2013 | Schrecker | |
| 2013/0311313 A1 | 11/2013 | Laracey | |
| 2014/0019358 A1 | 1/2014 | Priebatsch | |
| 2014/0025581 A1 | 1/2014 | Caiman | |
| 2014/0040133 A1 | 2/2014 | Lee | |
| 2014/0108785 A1 | 4/2014 | Lindteigen | |
| 2014/0278894 A1 | 9/2014 | Toumayan | |
| 2015/0046330 A1 | 2/2015 | Hanafi | |
| 2015/0100495 A1 | 4/2015 | Salama | |
| 2015/0254635 A1 | 9/2015 | Bondesen | |
| 2015/0262170 A1 | 9/2015 | Bouda | |
| 2016/0073263 A1 | 3/2016 | Wolosewicz | |
| 2017/0270524 A1 | 9/2017 | Kim | |
| 2018/0137498 A1 | 5/2018 | Kim | |
| 2019/0156326 A1 | 5/2019 | Todasco | |

OTHER PUBLICATIONS

Office Action dated Jul. 14, 2022 issued in CA 2961916.
Office Action dated Sep. 2, 2022 issued in CA 3126471.
Office Action dated Sep. 14, 2022 issued in CA 2963287.
Office Action dated Sep. 21, 2022 issued in U.S. Appl. No. 14/869,186.
Office Action dated Sep. 30, 2022 issued in U.S. Appl. No. 14/879,913.
Office Action dated Sep. 2, 2022 issued in CN 201780028338.X.
Summons to Oral Proceedings dated Jul. 1, 2021 issued in EP 17762362.6.
Office Action dated Jun. 30, 2021 issued in CN 201780028338.X.
Notice of Allowance dated Aug. 19, 2021 issued in U.S. Appl. No. 15/453,193.
Office Action dated Aug. 30, 2021 issued in U.S. Appl. No. 15/648,942.
Office Action dated Oct. 13, 2021 issued in U.S. Appl. No. 15/884,847.
Office Action dated Oct. 25, 2021 issued in CA 2963287.
Office Action dated Octobers, 2021 issued in CA2961916.
Office Action dated Nov. 26, 2021 issued in U.S. Appl. No. 14/879,913.
Knott, What is Private Key Encryption, Koolspan, Mar. 6, 2014 retrieved from https://web.archive.org/web/20140306101755/http://www.koolspan.com/blog/private-key-encryption/(Year:2014).
Summons to Oral Proceedings dated Dec. 14, 2021 issued in EP 15846067.5.
Office Action dated May 25, 2021 issued in U.S. Appl. No. 14/879,913.
Gao, J. et al., "A 2D Barcode-Based Mobile Payment System," 2009 Third International Conference on Multimedia and Ubiquitous Engineering, 2009, pp. 320-329, doi: 10.
Office Action dated May 25, 2021 issued in U.S. Appl. No. 16/007,955.
Office Action dated Jun. 9, 2021 issued in EP 15848487.3.
Office Action dated Apr. 12, 2021 issued in AU 2016287789.
Office Action dated May 18, 2021 issued in AU 2015330644.
Office Action dated Apr. 16, 2021 issued in AU 2015330644.
Office Action dated Apr. 30, 2021 issued in AU 2015327722.
Office Action dated May 4, 2021 issued in EP 16816879.7.
Notice of Allowance dated May 8, 2021 issued in CN 201680016674.8.
Office Action dated Apr. 13, 2021 issued in CN 201580064986.1.
Office Action dated Apr. 14, 2021 issued in CN 201580067059.5.
Office Action dated Nov. 16, 2020 issued in AU 2016208989.
Office Action dated Dec. 3, 2020 issued in CN 201580064986.1.
Office Action dated Nov. 30, 2020 issued in CN 201580067059.5.
Office Action dated Jan. 13, 2021 issued in U.S. Appl. No. 14/869,186.
Office Action dated Jan. 26, 2021 issued in EP 16739695.1.
Office Action dated Jan. 26, 2021 issued in U.S. Appl. No. 15/453,193.
Notice of Allowance dated Mar. 30, 2021 issued in CA 2830260.
Notice of Allowance dated Mar. 25, 2021 issued in U.S. Appl. No. 15/201,428.
Notice of Allowance dated Mar. 24, 2021 issued in U.S. Appl. No. 15/000,685.
Office Action dated Apr. 21, 2021 issued in U.S. Appl. No. 15/884,847.
Office Action dated Nov. 25, 2020 issued in CN 201680016674.8.
Office Action dated Jun. 13, 2022 issued in U.S. Appl. No. 17/352,174.
De, P. et al., Towards an interoperable mobile wallet service, 2013 10th International Conference and Expo on Emerging Technologies for a Smarter World (CEWIT), 2013, pp. 1-6, doi: 10.1109/CEWIT.2013.6713767.
Office Action dated Jun. 17, 2022 issued in U.S. Appl. No. 15/648,942.
Office Action dated Jun. 2, 2022 issued in U.S. Appl. No. 14/869,186.
Office Action dated Mar. 2, 2022 issued in CN 201780028338.X.
Office Action dated Jul. 26, 2022 issued in AU 2021203226.
Office Action dated Aug. 2, 2022 issued in AU 2021203623.
Office Action dated Aug. 2, 2022 issued in EP 16739695.1.
Office Action dated Mar. 30, 2022 issued in U.S. Appl. No. 14/879,913.
Office Action dated Nov. 29, 2021 issued in CN 201580067059.5.
Office Action dated Dec. 27, 2021 issued in U.S. Appl. No. 14/869,186.
Notice of Allowance dated Nov. 15, 2021 issued in AU 2016208989.
Office Action dated Jan. 20, 2022 issued in AU 2017231106.

(56) References Cited

OTHER PUBLICATIONS

Notice of Allowance dated Feb. 7, 2022 issued in U.S. Appl. No. 16/007,955.
Balan, R.K. et al., "The Digital Wallet: Opportunities and Prototypes", in Computer, vol. 42, No. 4, pp. 100-102, Apr. 2009, doi: 10.1109/MC.2009.134 (Year: 2009).
Office Action dated Mar. 4, 2022 issued in U.S. Appl. No. 15/648,942.
Office Action dated Mar. 21, 2022 issued in U.S. Appl. No. 15/884,847.
Office Action dated Mar. 1, 2022 issued in CA 2974151.
European Extended Search Report dated Oct. 21, 2022 issued in EP 22173329.8.
Notice of acceptance dated Dec. 22, 2023 issued in AU 2017231106.
European Extended Search Report dated Jan. 19, 2023 issued in EP 22187813.5.
Office Action dated Oct. 27, 2022 issued in CA 2991073.
Notice of allowance dated Nov. 3, 2022 issued in U.S. Appl. No. 15/648,942.
Office Action dated Nov. 8, 2022 issued in U.S. Appl. No. 15/884,847.
Office Action dated Dec. 15, 2022 issued in U.S. Appl. No. 17/352,174.

\* cited by examiner

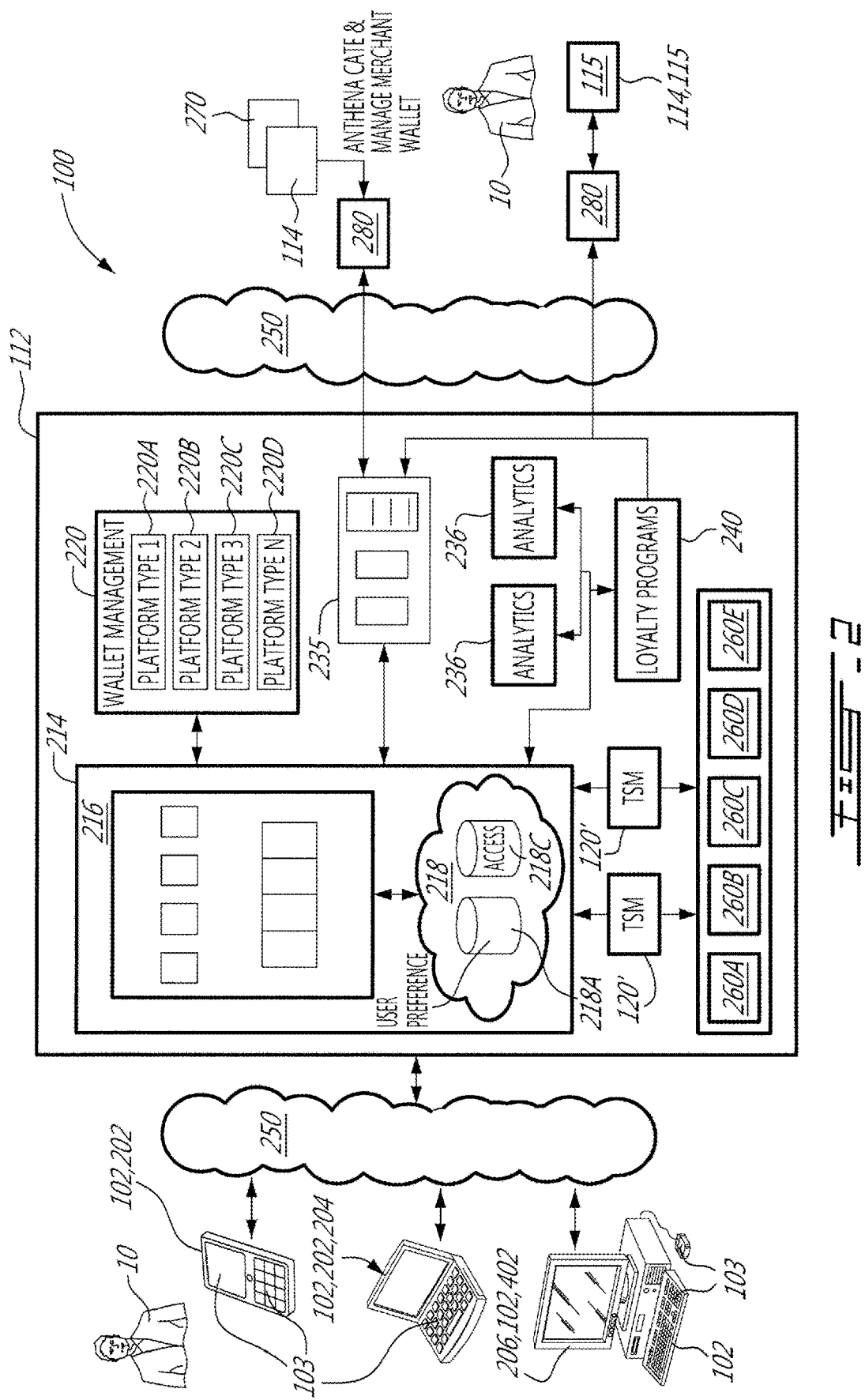

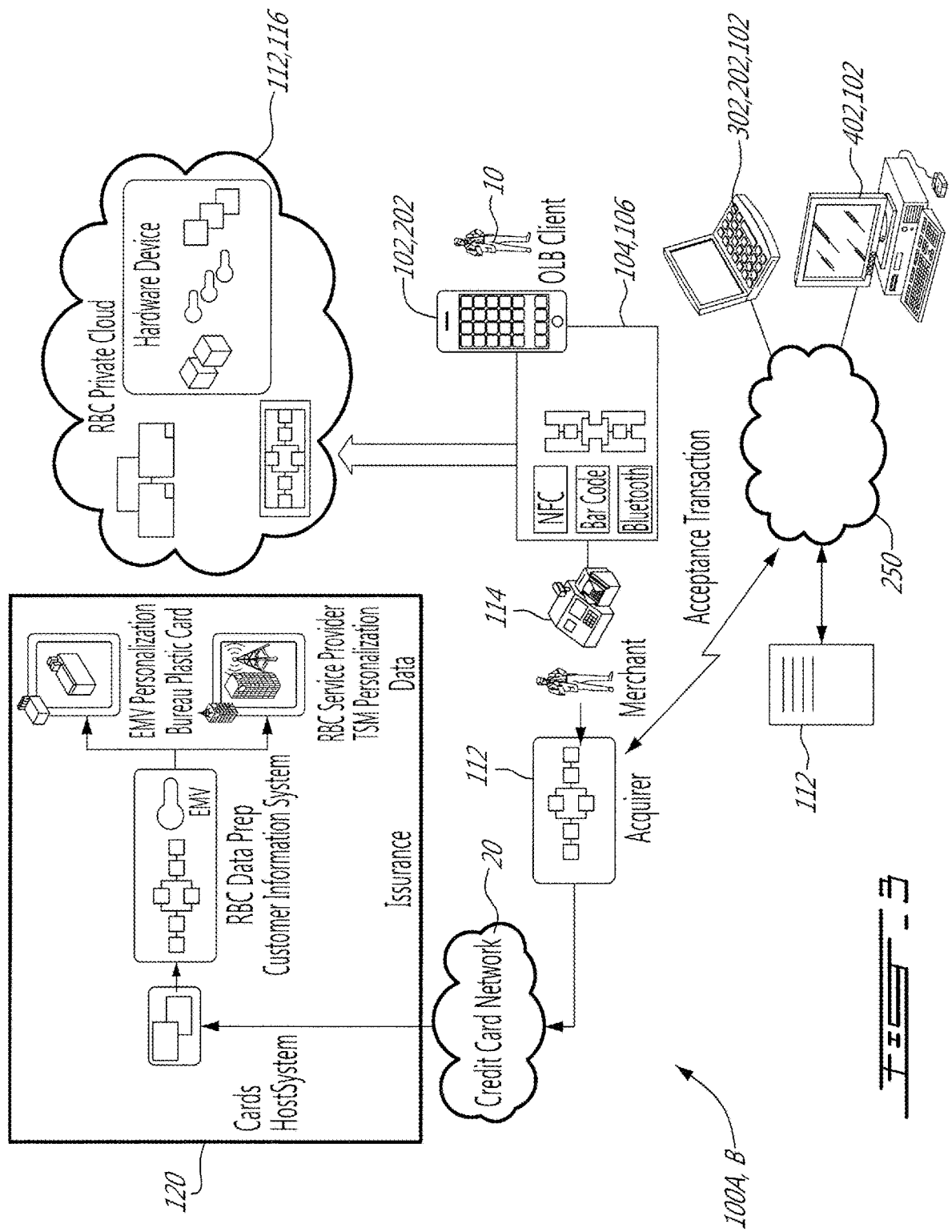

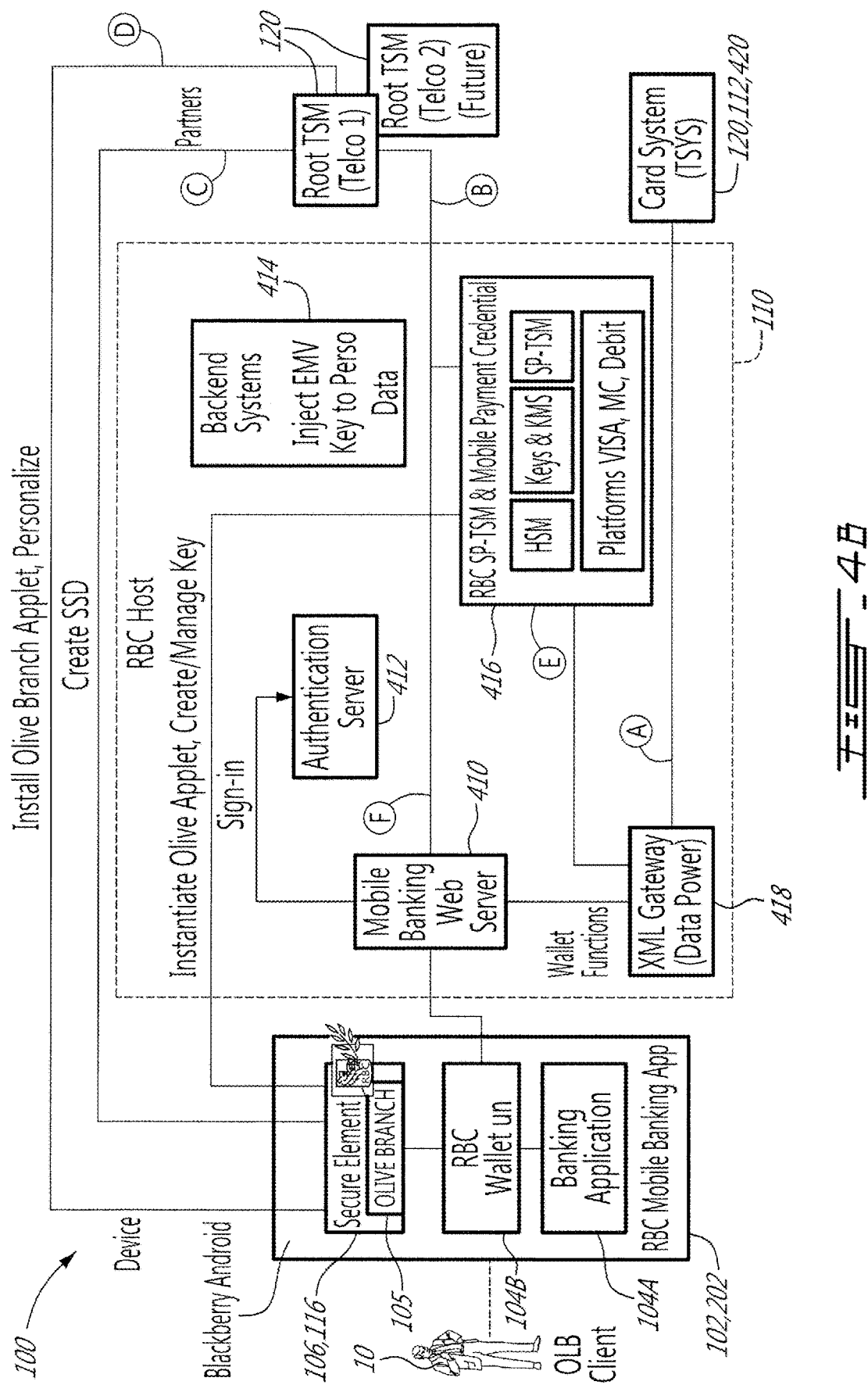

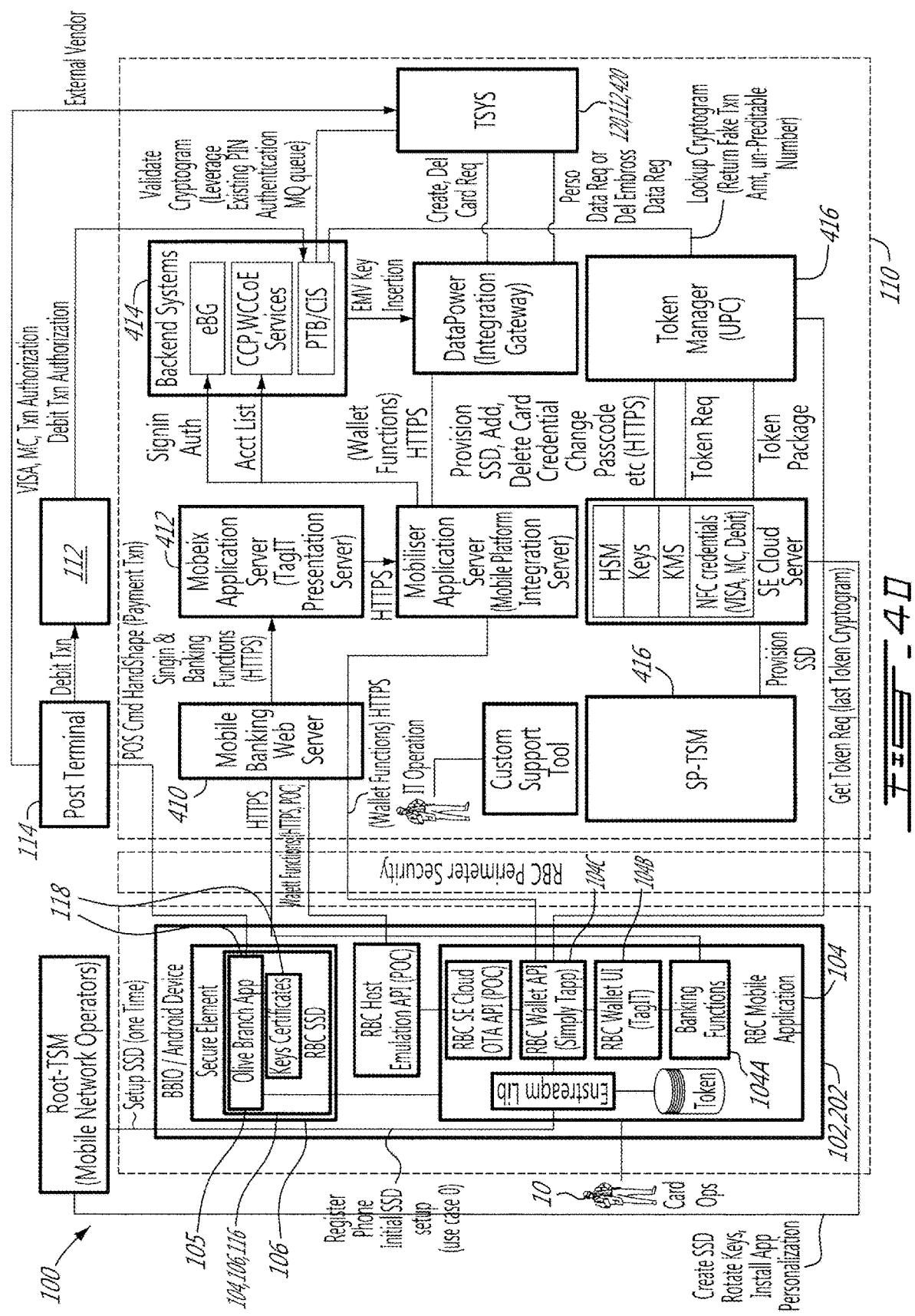

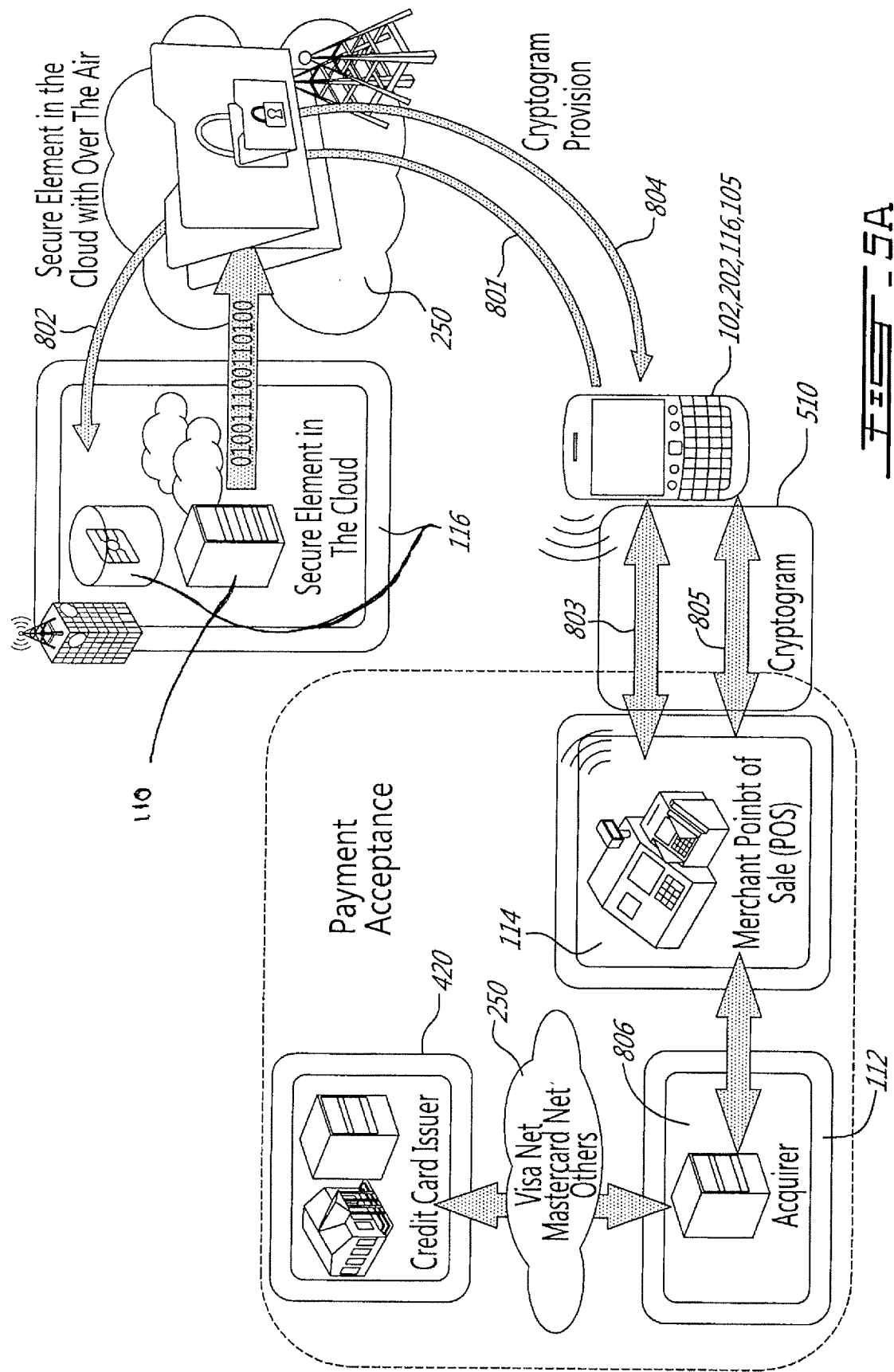

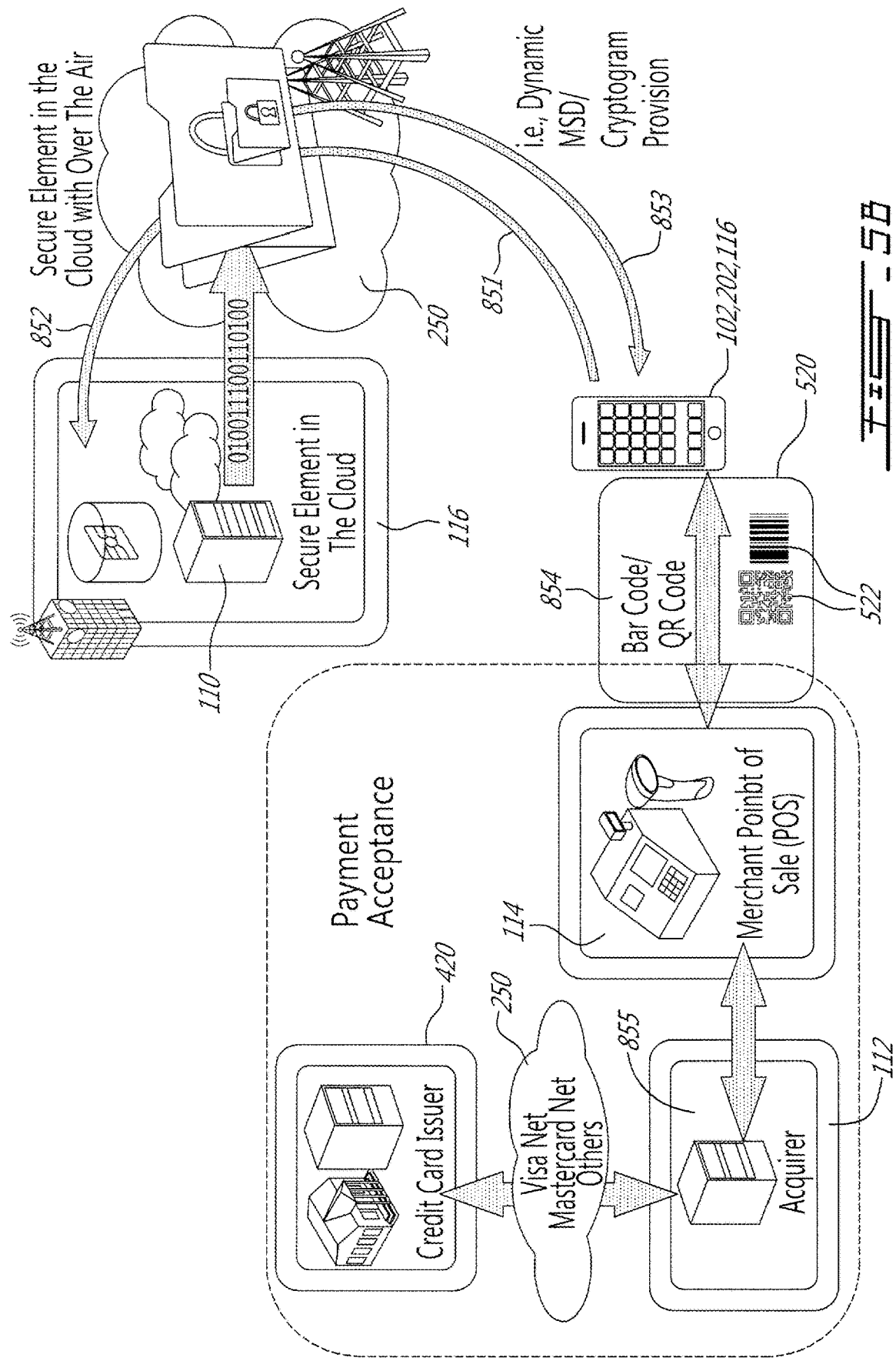

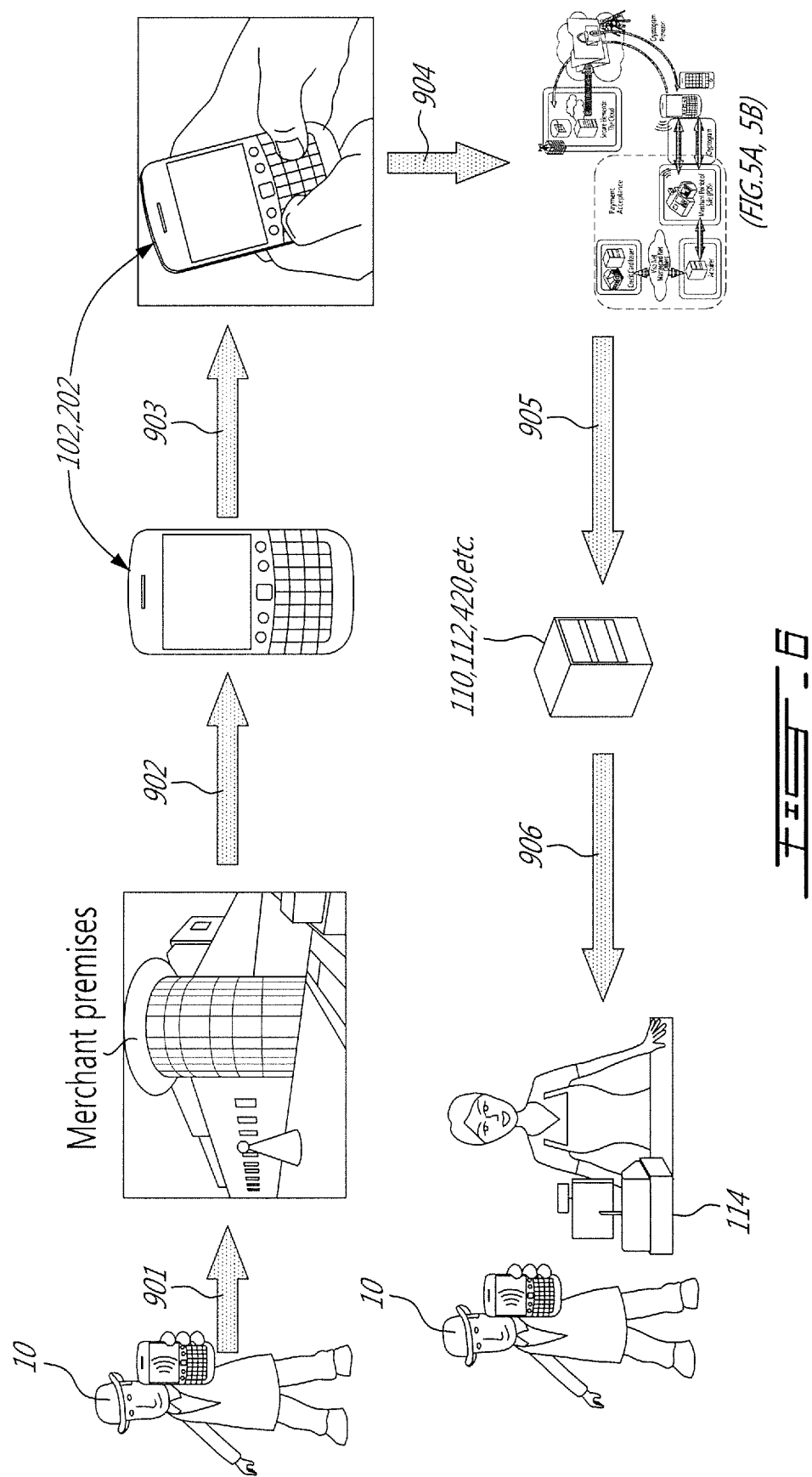

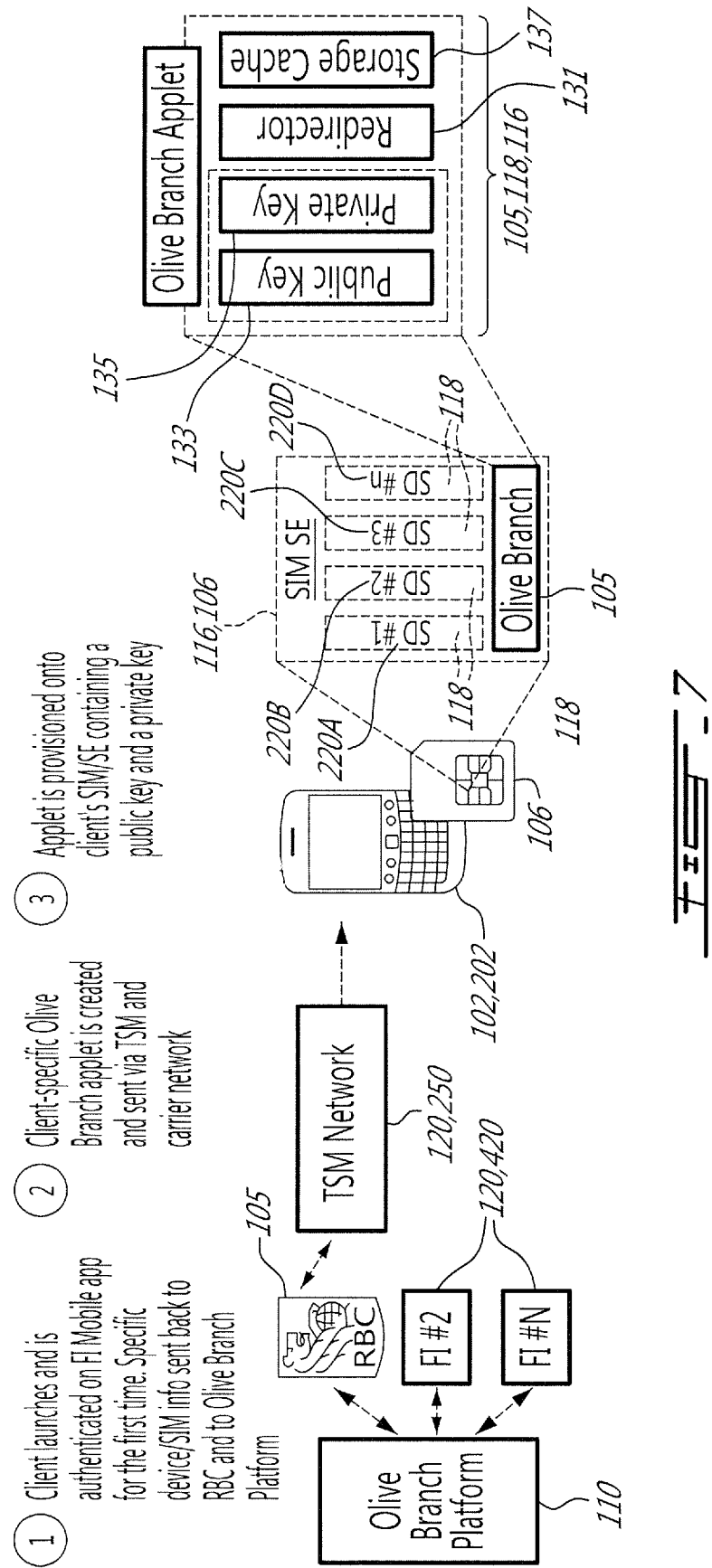

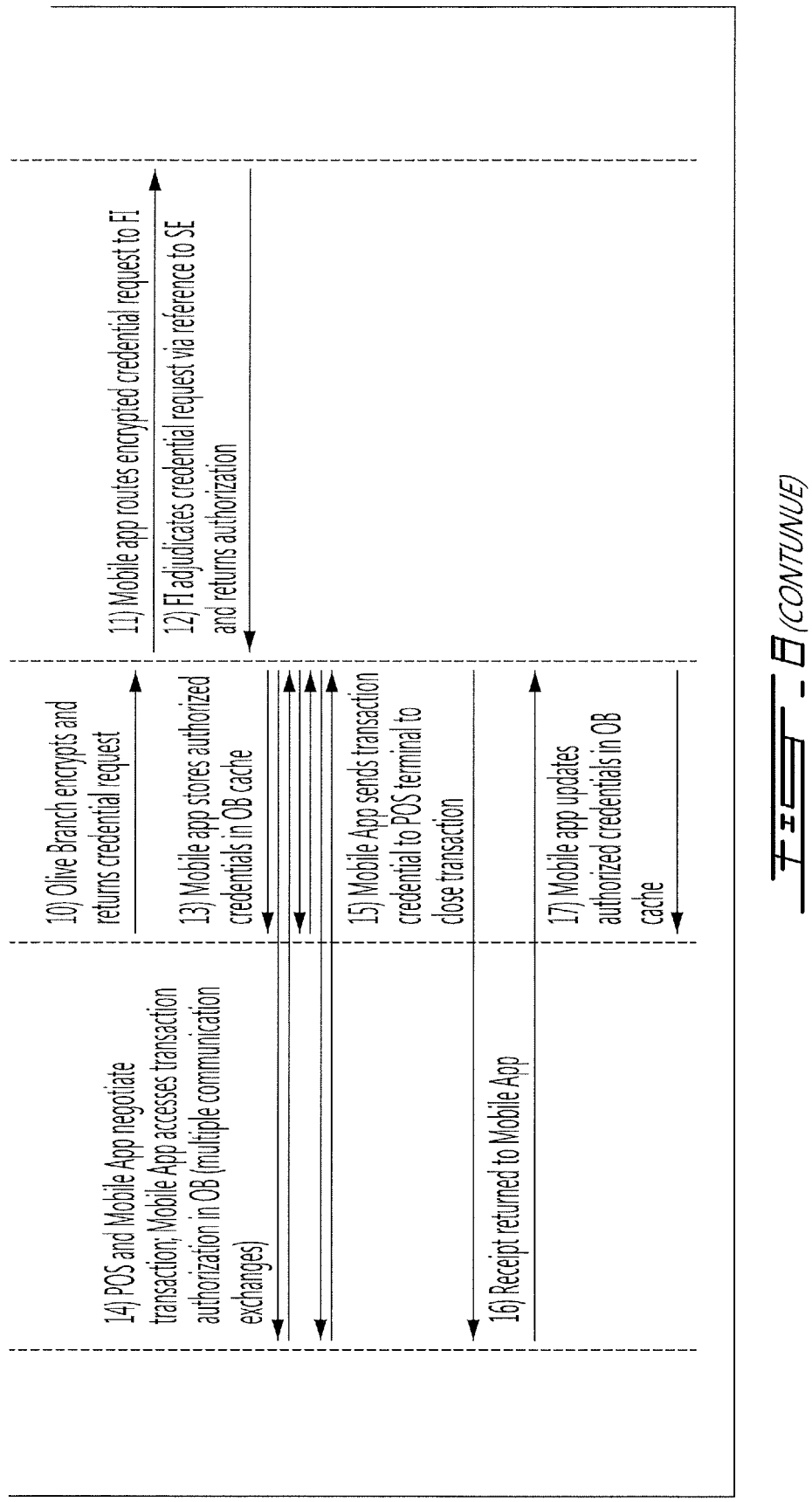
FIG. 8 (CONTINUE)

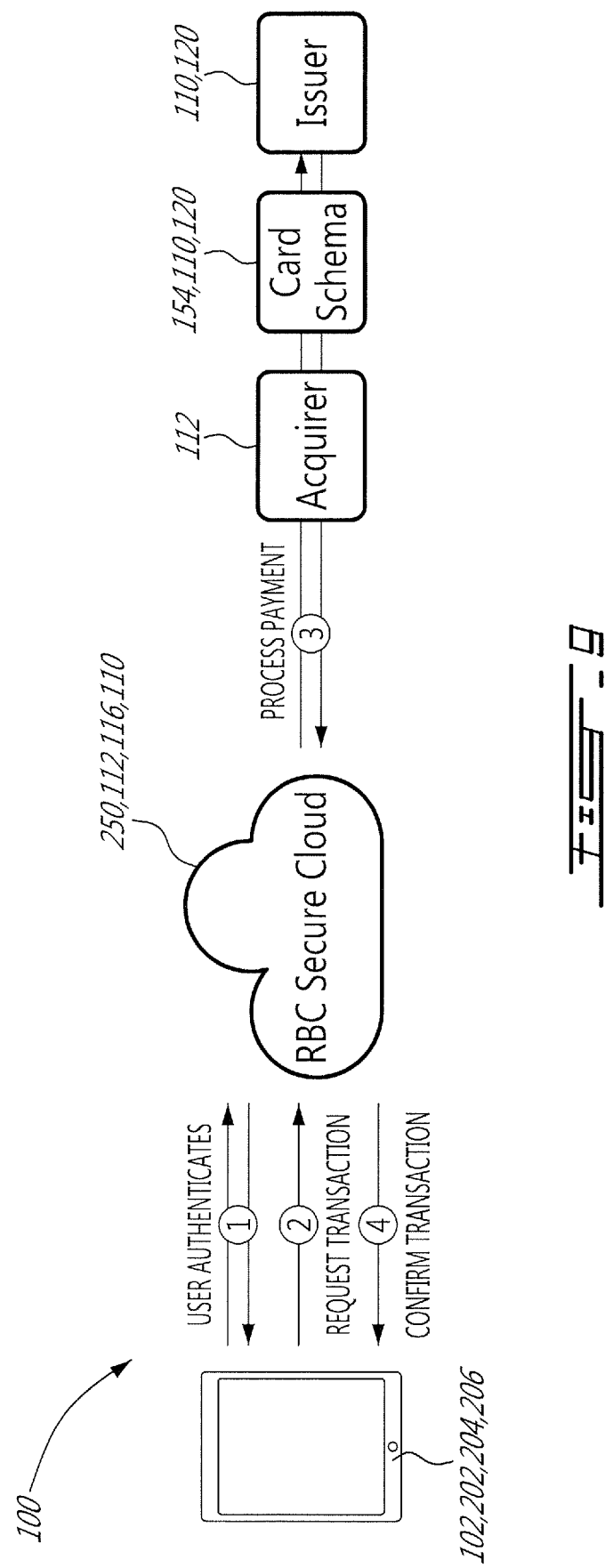

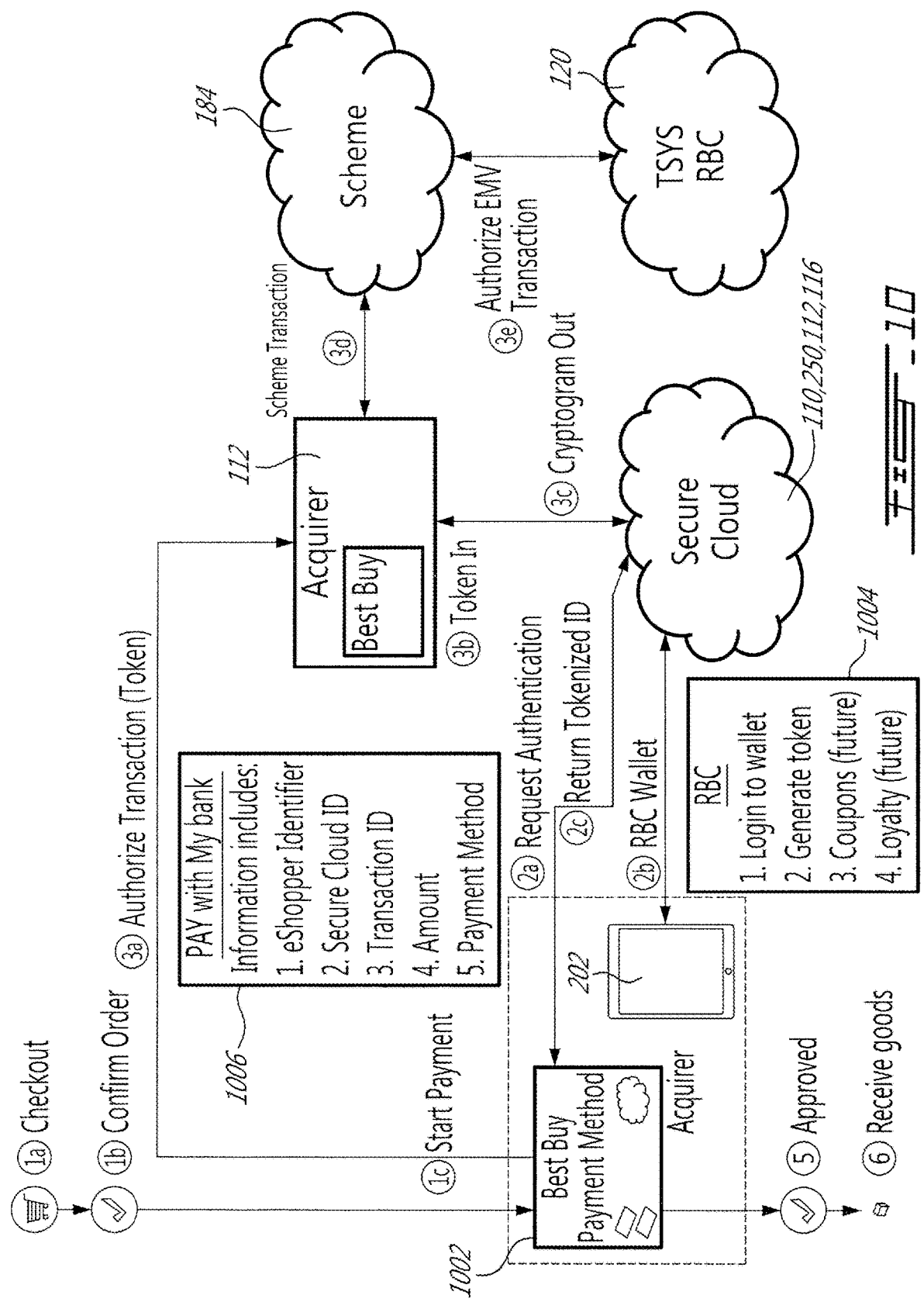

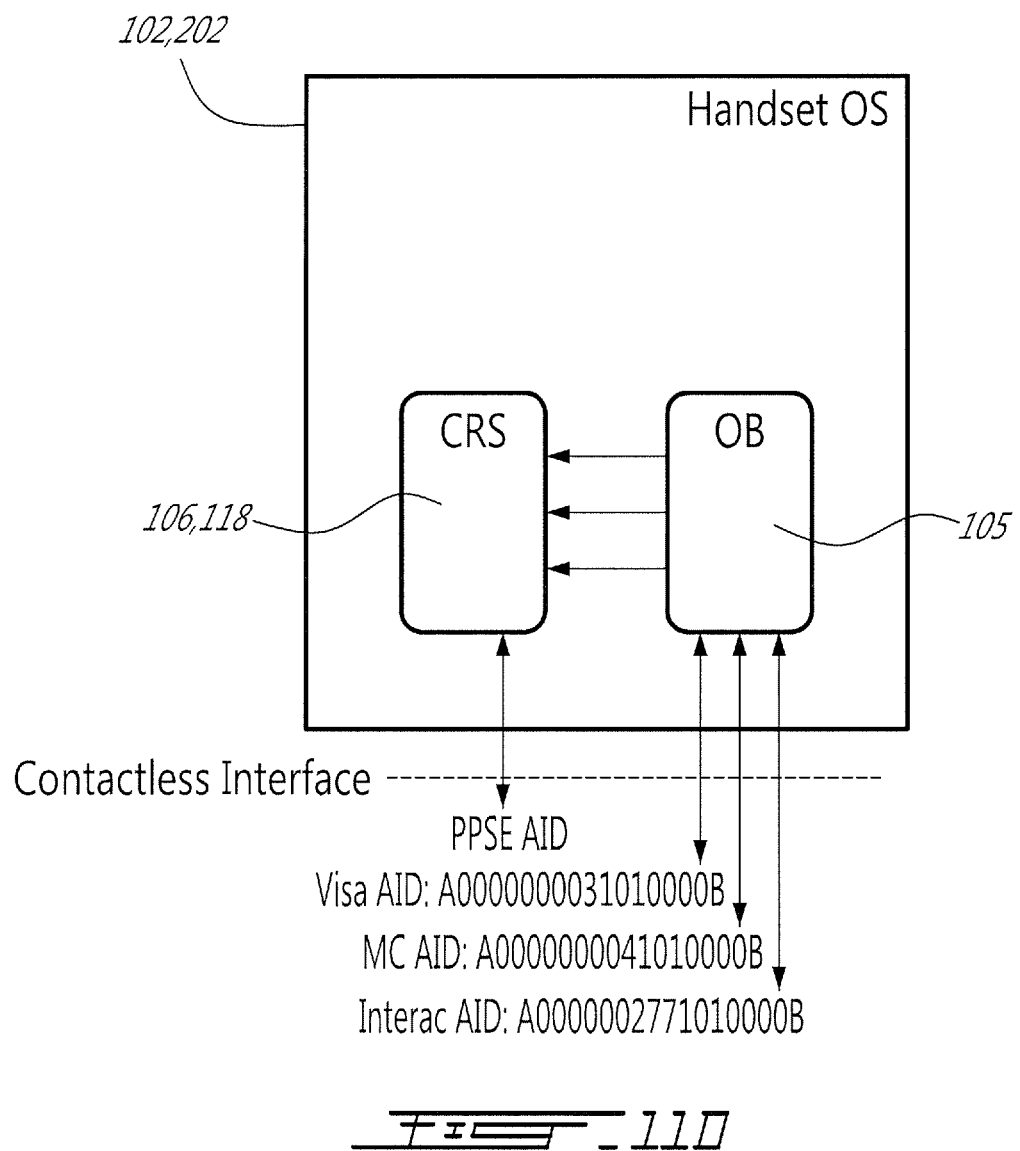

OB specifics 3 - Loading Tokens

1) From the handset side, the wallet application is designed to communication and load tokens to OB through the OB AID: A0000005691010000B 2) JSR 177 spec is used as seen here to communication with OB:

APDUConnection Example
The following example shows how an APDUConnection can be used to access a smart card application.

```
APDUConnection acn = null;
try{ // Create an APDUConnection object
acn = (APDUConnection) Connector.open("apdu:0;target=A0.0.0.5.69.10.10.0.B");
// Send a command APDU and receive response
APDU responseAPDU = acn.exchangeAPDU (commandAPDU);
...
} catch (IOException e) { ... }
finally {
    ...
    if (acn != null) {
    // Close connection
    acn.close ();
    } ...
} ...
```

FIG. 17

VIRTUALIZATION AND SECURE PROCESSING OF DATA

CROSS-REFERENCE TO RELATED APPLICATIONS

This is a continuation of U.S. patent application Ser. No. 14/705,477, filed 6 May 2015 and entitled VIRTUALIZATION AND SECURE PROCESSING OF DATA, which is a continuation of U.S. patent application Ser. No. 14/056,440, filed 17 Oct. 2013 (now U.S. Pat. No. 9,082,119) and entitled VIRTUALIZATION AND SECURE PROCESSING OF DATA, which claims all benefit, including priority, of:

U.S. Provisional Patent Application Ser. No. 61/715,142, filed 17 Oct. 2012 and entitled SECURE PROCESSING AND STORAGE OF PAYMENT DATA;

U.S. Provisional Patent Application Ser. No. 61/811,783, filed 14 Apr. 2013 and entitled SECURE PROCESSING AND STORAGE OF PAYMENT DATA; and U.S. Provisional Patent Application Ser. No. 61/825,865, filed 21 May 2013 and entitled SECURE PROCESSING AND STORAGE OF PAYMENT DATA;

U.S. Provisional Patent Application Ser. No. 61/833,188, filed 10 Jun. 2013 and entitled SECURE PROCESSING AND STORAGE OF PAYMENT DATA;

U.S. Provisional Patent Application Ser. No. 61/863,593, filed 8 Aug. 2013 and entitled SECURE PROCESSING AND STORAGE OF PAYMENT DATA;

U.S. patent application Ser. No. 14/705,477 is also a continuation of U.S. patent application Ser. No. 14/287,134, filed 26 May 2014 and entitled SECURE PROCESSING AND STORAGE OF PAYMENT DATA, which itself is a continuation of U.S. patent application Ser. No. 14/056,440 (now U.S. Pat. No. 9,082,119);

the entire contents of each of which are incorporated herein by this reference.

TECHNICAL FIELD

The present disclosure relates generally to systems, methods, and machine-interpretable programming and/or other instruction products for the secure processing of data. In particular, the disclosure relates to the secure creation, administration, manipulation, processing, and storage of electronic data useful in processing of payment transactions and other data processes, using secure identifiers, payment elements such as virtual wallets and payment tokens, and other devices and processes.

Aspects of the material disclosed in this application relate to the creation, administration, manipulation, processing, and storage of data useful in processing of payment transactions. Aspects of such creation, administration, manipulation, processing, and storage may be subject to regulation by governmental and other agencies. The disclosure herein is made solely in terms of logical, economic, and communications possibilities, without regard to statutory, regulatory, or other legal considerations. Nothing herein is intended as a statement or representation that any system, method or process proposed or discussed herein, or the use thereof, does or does not comply with any statute, law, regulation, or other legal requirement in any jurisdiction; nor should it be taken or construed as doing so.

SUMMARY OF THE INVENTION

In various aspects, the disclosure provides systems, methods, and non-transient machine-interpretable data representing executable instruction sets and/or other products for the processing of data. In particular, the disclosure relates to the secure creation, administration, manipulation, processing, and storage of electronic data useful in the processing of payment transactions and other secure data processes.

For example, in various aspects and embodiments the disclosure provides secure means for the authorization of sensitive and other data processes subject to controlled access. Such processes include, for example the creation, administration, authorization, manipulation, processing, and storage of electronic data representing characteristics of, instructions for, and information associated with consumer, business, and other payment accounts, and other forms of secure payment elements, such as payment tokens; and data useful in processing transactions using such accounts and elements. Information associated with particular payment means, such as accounts or payment tokens, can be stored, for example, in a data set, usually secure, sometimes referred to as a virtual or electronic wallet, or a secure payment token.

Instruction sets and other data related to the execution of other controlled or controllable processes, such as the creation, storage, and other manipulation or control of image, text, and other media files, may be authorized and controlled through the use of the same and other embodiments of the invention.

Among the many improvements and advantages offered by the invention is the use of multiple authorization codes in the authorization of transactions and other sensitive or secure data processes. In various aspects and embodiments, for example, the invention provides for the use of three or more authorization codes in authorizing a requested data process, each of the authorization codes being associated, for example, with different aspects of the requested process.

For example, in one aspect the invention provides methods authorizing data processes. Such a process may, for example, be performed by one or more processors of, or otherwise associated with, an authorization adjudication server, and may comprise receiving a data processing request generated by an requesting client device, the data processing request comprising data representing at least one identifier associated with an application data set; data representing at least one identifier associated with a requesting user of a data processing application associated with the application data set; and at least one identifier associated with the requesting client device; accessing an authorization data set and determining that the received identifier associated with an application data set is compatible with authorization of the data processing request; the received identifier associated with a requesting user of the data processing application corresponds to at least one authorized user of the data processing application; and the received identifier associated with the requesting client device corresponds to at least one authorized client device associated with the application authorization data set; and, conditioned on such determination, authorizing execution of the requested data process.

It can be particularly advantageous, in various aspects and embodiments of the invention, for the various authorization codes to be uniquely associated with the various respective aspects of the process. For example, in a process for authorizing a payment transaction, such authorization codes may be uniquely associated with any one or more of a mobile or other network communication device, such as a smart phone or desk top computer, used to generate a transaction request; an individual user or other entity associated with the requested transaction; and/or a payment account to be used in completing the transaction. In another example, such identifiers may be uniquely and/or otherwise associated with a user of a device used to generate a storage or other image processing request, a data file associated with such request, and a data storage or other image processing request.

It may be of further particular advantage, in the various aspects and embodiments of the invention, for identifiers and other authorization codes to be encrypted, using for example public key/private key and/or other encryption schemes.

As previously noted, the invention may be applied in a very wide variety of contexts. Thus, for example, it may be applied in the context of secure payment transactions. For example, in such a context the invention can provide secure methods for authorizing payment transactions, in which a transaction communication device, such as a desktop computer, a smart phone, or other mobile computing device, comprising one or more network communication systems, one or more processors, and one or more persistent memory devices comprising data representing at least an identifier associated with at least one authorized user of at least one transaction payment account; at least one identifier associated with the transaction communication device; and an identifier associated with the at least one transaction payment account; executes a machine-executable coded instruction set configured to cause the at least one data processor to access the persistent memory device and generate a transaction request data set. Such a transaction data set can comprise at least the at least one identifier associated with at least one authorized user of at least one transaction payment account; the at least one identifier associated with the transaction communication device; and the identifier associated with the at least one transaction payment account. Such methods may further comprise routing the generated transaction data request to a transaction adjudication server, using the network communication system, for adjudication/authorization and/or further processing of the requested transaction.

As previously noted, identifiers related to any or all of the authorized user of the transaction account, the transaction payment account, and/or the transaction communication device may be uniquely associated with such user(s), account(s), and/or device(s).

It may be particularly advantageous, in various embodiments and aspects of the invention, that identifiers and other data, as well as data representing executable instruction sets, to be stored in secure elements and/or other secure memory, on devices used to generate transaction and other data processing requests, and in adjudication servers and other components of networked data processing servers. Such secure memory may be provided, for example, on secure elements on subscriber identity module (SIM) cards, secure digital (SD), and/or other removable memory devices.

In further aspects and embodiments, the invention provides improved systems, methods, and instruction sets for the secure and convenient accessing of data processing applications on devices used in generating data processing requests, including for example requests for authorization of financial transactions. For example, in one such aspect the invention provides methods, performed by processors of transaction communication devices. Such transaction communication devices can, for example, comprise input device(s) and network communication system(s) configured for from the input device(s), signals generated by a user of the device and representing a purchaser-defined identifier, such as telephone number, e-mail address, and/or other personal identifier, which identifier has previously been associated with a unique one of a plurality of applications executable by the device. For example, the user can input such an identifier and thereby cause the device, using at least the purchaser-defined identifier, to initiate or otherwise access or execute one of a plurality of transaction authorization data sets, using for example one of a plurality of virtual wallet applications; and, using at least the accessed transaction authorization data set, generate a transaction request data set, the transaction request data set comprising at least two of: an identifier associated with at least one authorized user of at least one transaction payment account, an identifier associated with the transaction communication device; and an identifier associated with the at least one transaction payment account; and to route the generated transaction data request to a transaction adjudication server, using the wireless communication system.

As will be appreciated by those skilled in the relevant arts, various forms of secure transactions may be processed through the whole or partial use of specialized application programs ("applications") installed upon or otherwise executable under the control of transaction request devices such as mobile and desktop computers. For example, electronic payment, and/or other aspects of proposed or consummated transactions, can be implemented using electronic or virtual wallets. Such wallets typically comprise, or otherwise enable access to, secure data sets representing identifiers such as various forms of information associated with specific purchasers. Such a data set may, in some circumstances, alternatively be referred to as a purchaser's profile, and can include or otherwise be associated with a name, telephone number, physical and/or e-mail address, and/or other identification information associated with one or more purchasers, together with application or process-specific information or identifiers, such as payment information representing one or more different forms or types of payment that the purchaser has been authorized to use. For example, each purchaser account data set may include one or more credit card numbers, one or more bank card numbers, one or more gift card numbers, or any other information associated with any type(s) and number(s) of accounts or other payment means associated with a purchaser or group of purchasers. Each such data set may further include, or be associated with, purchaser identification information such as data representing government or privately-issued IDs such as passports, photos, birth certificates, drivers or citizen identification cards, etc., and/or images thereof.

A further example of application of the invention to secure data processes includes the use of secure payment tokens to implement, for example, 'card present' transactions in which physical credit, debit, or other payment cards, including for example cards comprising secure data storage chips, etc., are not available or are not to be used.

As will be appreciated by those skilled in the relevant arts, once they have been made familiar with this disclosure, a secure payment token can comprise an encrypted or otherwise secure data set representing all information required, when deciphered and/or otherwise properly interpreted, to effect and/or evidence payment, or authority for payment, of fixed, limited, and/or otherwise pre-authorized amount(s).

Such token(s) may, for example, comprise and/or be stored in memory of mobile and/or non-mobile device(s) adapted for electronic presentation in completing a transaction. For example, such a secure token securely stored in a mobile telephone (e.g., a "smart" phone) or other personal digital assistant (PDA) may be presented electronically at a point of sale (POS) or point of transaction (POT) as legal tender of a specific, previously-authorized payment useful in completing, or helping to complete, an identified transaction, or as evidence of credit or other binding payment authorization. Such payment can, for example, be analogous to presentation of cash at the point of sale, or to presentation of a credit, chip or other value-transfer card in a 'card present' transaction.

In various aspects and embodiments of the disclosure, secure means for creating, administering, manipulating, processing, and storing of electronic data representing application such as virtual wallets, secure tokens, identifiers and other authorization codes or information, and other information associated with consumer, business, and other payments and/or payment accounts useful in processing payment transactions, and data resulting from or otherwise associated with such processes, can be stored in secure memory remote from devices used by purchasers to provide payment authorizations. For example, such information may be stored centrally, in a secure environment such as a subsecurity domain (SSD) maintained by a bank or other financial institution (FI) or payment service provider.

In the same and other embodiments, secure payment tokens and/or other data sets useful in the implementation and/or completion of secure payment transactions can be stored in suitably secure memory(ies) on consumer or other user-controlled devices, including for example specially-provided secure memories, which can for example comprise or be included on secure subscriber identity module (SIM) cards, secure digital (SD) card (including for example mini- and micro-SD cards) and/or other removable memory devices, and/or in embedded memory such as segregated or otherwise secure registers on mobile smart phones, tablet computers, or other PDAs, and/or on purchaser devices such as a home computer system, countertop system operated by a merchant or other vendor.

Among the advantages offered by such embodiments is that data representing payment information associated with a wide number and types of payment sources (e.g., bank or credit accounts) available to a single purchaser, or set of purchasers, may be stored together in any one or more of a large number and types of safe, segregated environment(s). Such combined, secure storage can, for example, provide improvements in both physical and data security. For example, storage in a secure environment such as a cloud established and/or maintained by a financial institution can be significantly more secure than a purchaser's mobile device.

Further advantages include enabling users of smart phones and other PDAs to complete 'card-present' and/or cash-equivalent transactions using secure tokens stored on their PDAs, even when network communications are not available, or when access to remotely-stored account data is otherwise not available.

Transactions processed in accordance with the disclosure may include any type(s) in which consideration(s) is to be exchanged or security is otherwise required or desirable. Such transactions or other processes can, for example, include transactions based on, or equivalent to, payment using credit, debit, rewards, and stored value (e.g., gift) accounts, including for example card-based and/or card-implemented accounts, as well as vouchers and/or any other forms or systems for transferring consideration in sale, lease, rental, or other transactions. They can also include secure data generation, transfer, and storage processes for use with image, text, and or other media data.

Through the use of appropriately-configured systems, improvements in accordance with the disclosure can simplify, and otherwise improve the efficiency of, the creation and modification of secure data processing requests, such as payment system data sets provided by various payment service providers, such as payment processors, financial institutions, and financial communications operators.

The use of appropriately-configured systems in accordance with the disclosure are compatible with, and can provide efficiencies through the adoption of, new technologies, such as improved telecommunications, wireless, and/or near-field technologies and/or protocols. For example, transition from a GSM or other wireless telecommunications protocol to Bluetooth, NFC, bar-code, QR (quick-response)-type protocols can be made significantly more efficient and cost-effective. In many embodiments, improved communications systems/protocols, including for example current or later-developed Bluetooth (including Bluetooth LE), NFC, bar-code, QR (quick-response)-type technologies can be used advantageously at any or all points in the system, including for example on either purchaser and/or merchant/vendor side at the point of sale (POS). As a more specific example, which may be advantageously implemented in a wide variety of circumstances, Bluetooth (LE) technologies can be used to communicate with existing Bluetooth enabled POS terminals to process payments that are in accordance with GP EMV and/or other standards.

Creation, storage, manipulation and/or other processing of data stored in such remote secure environments can, in contemporary communications systems, provide economic as well as communications efficiencies. For example, the use of memory(ies) associated with a SIM card of a wireless device, and/or an embedded memory of such a device, must frequently be 'rented' from a telephone operator or other communications service provider ("telco") or the original manufacturer (OEM) of the wireless device. Systems and processes in accordance with the disclosure can help to minimize, eliminate, and/or otherwise optimize the need for and/or desirability of transactions and interactions with multiple entities and contracts involved in the renting of such memory.

The creation, storage, manipulation and other processing of data stored in such remote secure environments can be implemented by, for example, the use of improved architectures and instruction sets that enable secure calling of programs, functions, and other routines, and data fetch and store commands from such remote secure systems, as described herein and in the attached diagrams. Such secure calls may in effect be re-directed from calls to SIM cards or other secure memories on user devices to remote secure storage facilities.

In various embodiments, the invention provides methods and further components, including persistent (or "non-transient") machine-interpretable instruction sets, such as software, for implementing the various functions and processes described herein.

BRIEF DESCRIPTION OF THE DRAWINGS

Various aspects and embodiments of the invention are illustrated in the figures of the accompanying drawings, which are meant to be exemplary and not limiting, and in which like references are intended to refer to like or corresponding parts.

FIGS. 1-4D are schematic diagrams showing embodiments of systems and secure storage facilities in accordance with the disclosure, and associated processes and devices.

FIGS. 5A and 5B are schematic diagrams illustrating embodiments of process flows useful in effecting payment transaction using secure elements and authorizations in accordance with the disclosure.

FIG. 6 is a schematic diagrams showing an embodiments of a process flow useful in effecting or facilitating secure payment through person to person interactions in accordance with the disclosure.

FIG. 7 illustrates aspects of implementation of secure elements and devices in accordance with the disclosure.

FIGS. 8-10 are schematic diagram showing data communications exchanges suitable for use in initiating and conducting purchase and/or other data processing transactions in accordance with various aspects of the disclosure.

FIGS. 11A-11D are schematic diagrams illustrating aspects of secure element and payment token provisioning and communications processes in accordance with the disclosure.

FIG. 12 shows example of a programming script suitable for use in implementing aspects of the invention, using the JSR-177 programming protocol.

DESCRIPTION OF EMBODIMENTS

Embodiments of various aspects of the invention are described through reference to the drawings.

Figure 1:
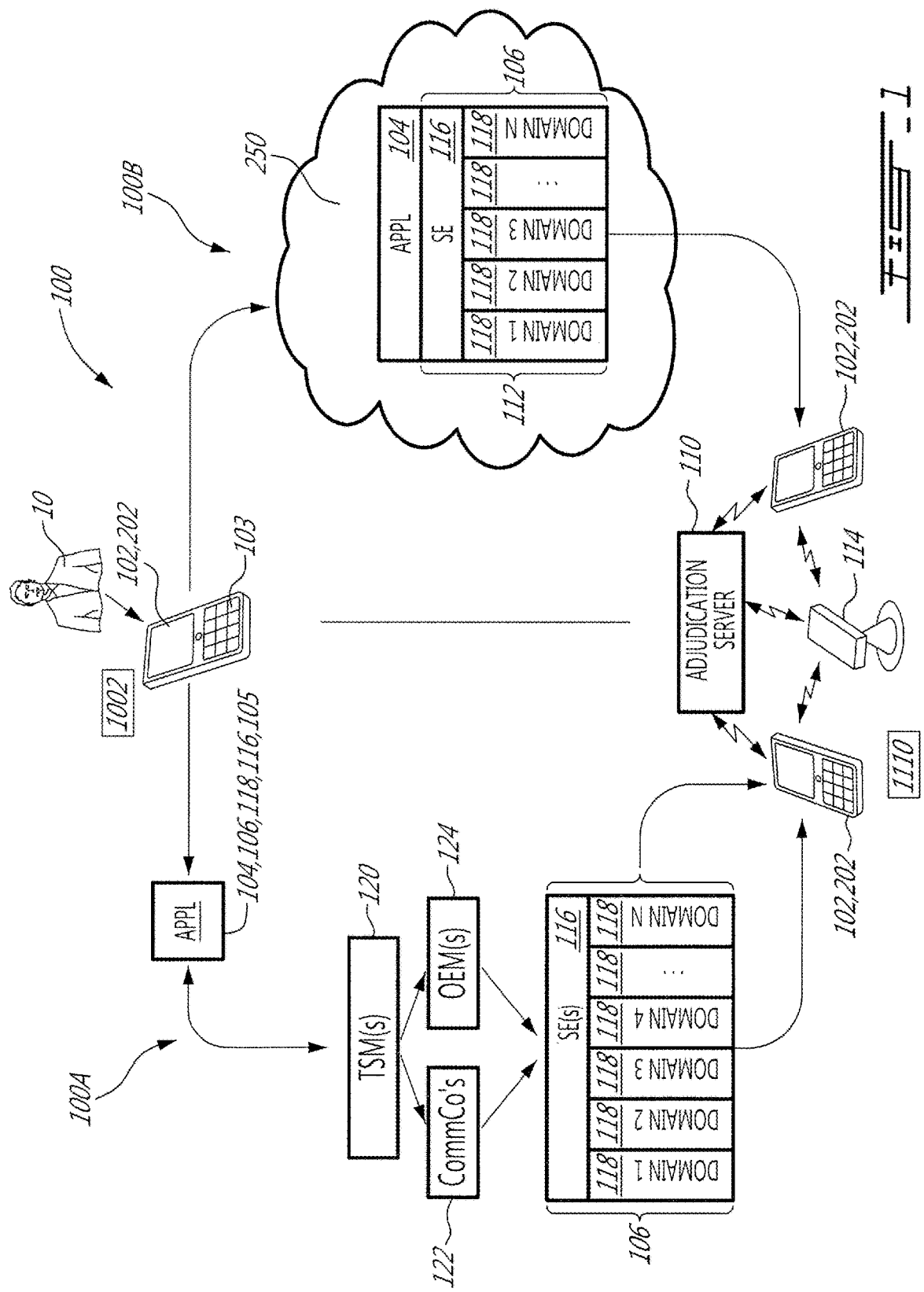

FIG. 1 is a schematic diagram showing an example system 100 suitable for use in implementing secure data processes in accordance with the invention. In FIG. 1, two architectures or subsystems 100A, 100B, and processes for requesting, authorization, and execution of secure data processing and storage of data thereby are illustrated. As will be understood by those skilled in the relevant arts, once they have been made familiar with this disclosure, architectures or subsystems 100A, 100B are not exclusive or incompatible with each other; rather they may advantageously be used separately, or in combination or in parallel with each other to achieve results in accordance with various embodiments described herein.

In the embodiment(s) shown, system 100 and subsystems 100A, 100B comprise, among other components, one or more transaction or data processing request devices 102, such as mobile device(s) 202, 203, desktop device(s) 402 (FIG. 2), or other data processing devices; data processing applications 104, such as virtual wallet(s) useful in purchase transactions, or image processing applications; persistent memory(ies) 106; and transaction or authentication adjudication server(s) 110.

In the architecture/embodiment of 100A, application 104 and/or memory(ies) 106, 116, 118 are stored on the user device 102, 202. In the embodiment 1008, some or all of application(s) 104 and/or memory(ies) 106, 116, 118 are stored in secure storage in the cloud, for example in a secure networked server.

At 1002, a purchaser such as a smart card holder, or other user, 10 of a process or transaction request device 102 can use a keypad, keyboard, touchscreen, or other input device 103 to access a data processing application 104, which application can reside wholly or partially on any or all of request device 102, financial or other application server 112, and/or any other suitably-accessible networked processing device. Application(s) 104 can access persistent memory(ies) 106 to read or otherwise access identifiers associated with the purchaser or user; the request device 102, and/or application(s) 104, such as financial account information to be used in a purchase transaction, and or all of which identifiers may be stored in, for example, one or more secure element(s) 116, and/or (sub)domains 118 thereof.

For example, at 1002, a purchaser device such as a smart (or chip) card, or a mobile computing/communications device (PDA) such as a smart phone, tablet, or laptop computer, or networked processor such as a desktop computer, can be used to create, access, and/or otherwise process securely-stored data related to one or more purchaser accounts. In the storage embodiment shown at 100A, a secure element 116 comprising purchaser financial data, which can for example include account and/or pre-authorized payment information (e.g., a secure payment token) is securely stored in persistent memory on the purchaser device 102. In the embodiment shown at 1008, such data is stored in a secure element (SE) such as a secure cloud-based communications facility, such as a cloud-based SSD, maintained or otherwise controlled in this example by a bank or other financial institution. In both cases, SE sub-domains 118 can be provided in the secure memory(ies) 106 and used, for example, to securely store authorization and other data related to a plurality of applications, such as, in a payment transaction context, purchaser and/or account information related to a number of different purchaser accounts ("Visa (VMPA)"; "Master Card," "PayPass," "MDA," "Debit (MDA)", and "VAS") and/or payments.

At 1110, at the bottom of FIG. 1, the same or another purchaser device 102, 202 is used to participate in a purchase or other transaction at a vendor or merchant point-of-sale (POS) device 114, such as an NFC (near-field communication) enabled device and/or card reader(s) 115.

Each of the (sub)systems 100A, 100B of FIG. 1 offers a variety of advantages. For example, in the embodiment shown at 100A, storage of application 104 and/or various types of authorization and transaction data in memory(ies) 106, 116, 118 on user or requesting device(s) 102, 202 enables the owner, administrator, and/or other user of the device 102, 202 to retain custody and control of the application 104 and/or memory(ies) 106, 116, 118, and responsibility therefor. For many users, this provides, for example, increased comfort in the knowledge that they themselves can provide ultimate security responsibility. Provisioning of such application(s) 104 and data stored in such elements 106, 116, 118 can be provided by any or all of communications service provider systems 122, original equipment manufacturers 124, and/or other trusted service provider or manager (TSM) systems 120, which can provide added value in the form of, for example, add-on applications and ancillary services.

A further significant advantage of the embodiment 100A is that an application wholly or partially stored on a device 102, 202, can provide security in binding the application to the specific device 102, 202, using hardware, firmware, or software features, using for example Global Platform (GP) standards. This can, for example, be used in either of embodiments 100A, 100B to confirm that a requesting user of a device 102, 202; the specific device 102, 202 used to generate the request; and account or other application information provided in a transaction or other data processing request are properly related, bound, to each other, and thereby, through comparison to authorization or authentication information stored by or otherwise available to an independent transaction or processing request adjudicator, to authorize a requested transaction or other data process.

By linking multiple, independent identity and function factors, such three-fold or other multiple-factor authentication features, architectures such as that shown at 100B, provide markedly superior authorization/authentication possibilities.

By providing such multi-parameter authorization processes, in which some or all of application(s) 104 and/or various types of authorization and transaction data may be stored in memory(ies) 106, 116, 118 in secure devices in the cloud (i.e., in devices accessible to the devices 102, 202, 114, 120, etc., via any one or more public and/or private local or wide area networks 250), the invention enables a number of further advantages, including for example superior physical security for sensitive data; reduction(s) in the amount of inter-device/inter-system communications by reducing or eliminating the need for TSMs and other intermediaries; allows many service providers, including a variety of banks or other transaction service providers, to leverage existing platforms or infrastructure, and opens new possibilities for expanded services and efficiencies.

A significant improvement enabled by the invention is the provision and unified control of a number of secure applications within a single wallet or other control application. This aspect of the invention can be particularly advantageous where, for example, a number of similar, or otherwise corresponding, applications, are provided on, or through, a single user device 102, 202, etc. For example, in the context of financial transactions, a single 'wallet' application can provide access to data and instructions adapted for use and control of transactions using accounts held and/or otherwise administered by a number of independent financial institutions. For example, a user having accounts with multiple banks and/or payment accounts held by different institutions can use various aspects of the invention to commonly and/or selectively store, access, and control the various accounts. Among the further advantages offered by this aspect of the invention is that a first institution, such as a bank or credit card company, that provides access to such a wallet or other application, can make memory and processing capacity available to other, non-affiliated institutions, and derive revenue thereby.

When, for example, a user of a device 102, 202, etc., wishes to access a wallet or other application, the application may be accessed in the corresponding location in the cloud, and desired or required information can be pulled by the device 102, 202 from its cloud-based storage location for use in POS or other transaction communications.

As will be understood by those skilled in the relevant arts, any communications, payment, and/or other protocols suitable for use in implementing the various aspects of the invention may be used. These include, for example, GSM, EMV-GP (Europay-MasterCard-VISA Global Platform), and other protocols. Global Platform is a platform/organization that has provided standards used to manage applications (e.g., Java Card Applets) on cards. It includes authentication schemes and authorization of additional "security domains", that may manage applications. EMV is a standard created by Europay, MasterCard and VISA for interoperability of smart cards, including SEs stored on SIM cards, etc., and POS (point of sale) terminals.

A secure element can, for example, comprise encrypted hardware (e.g., a suitably-configured SIM card), public/private keys and other cryptographic elements, and suitable communications devices for communication, through, for example, a controller of a device 102, 202, with an NFC or other communications system of the device 102 and thereby with merchant POS systems 114, servers 112, etc.

FIG. 2 provides a schematic diagram showing further examples of systems 100, and processes, suitable for implementing secure data processing and storage in accordance with the disclosure. The embodiments shown and described in Figure are consistent with those of FIG. 1, and provide further details of various embodiments 100A, 1008, etc.

In the embodiment(s) shown in FIG. 2, a payment transaction or other processing system 100 in accordance with aspects of the invention comprises an application server 112, such as a financial institution server comprising secure online banking or other payment account management module 214, comprising an online secure financial account and information system 216, which can for example be implemented by or on behalf of one or more banks or other financial institutions (FIs) and which can comprise one or more secure data bases 218; a client application/customer wallet management application 220, for managing virtual wallets and/or data processing applications which can wholly or partially reside on any desired client or customer device(s), including for example any one or more client laptop 204, desktop 206, or other mobile or stationary computers 102, 202, and/or any mobile devices such as palmtop, tablet, or other mobile communication device(s) 202, which can include various module(s) and/or application(s) for implementing or otherwise interacting with any of a very wide variety of financial and other data processing transactions, including debit, credit, and/or loyalty transactions; one or more rewards or other loyalty program servers 240, which may be administered by the same and/or other FIs, third-party program administrators, etc.; hardwired and wireless security and over-the-air (OTA) communications infrastructure 260; and a wide variety of third party partner systems, including for example merchants and cardholders 214, 270. As will be understood by those skilled in the relevant arts, once they have been made familiar with this disclosure, any or all of components 112, 214, 216, 220, 240, 260, 114, 270, etc., may be implemented in a very wide variety of forms and combinations, and may be controlled by a wide variety of entities, including FIs such as banks, merchants, consumers and other customers and clients, and third party service providers.

For example, application server(s) 112 may host or otherwise enable or provide any type(s) of data processing consistent with the purposes disclosed herein. These can include, for example, banks, brokerages, merchants, credit card, and other financial institutions, and other processors of secure financial transactions; secure text, image, or other media generation, storage, presentation, or control service providers; social media application servers, auctioneers and other commercial sites, etc.

Server(s) 112 in the form of online banking or other payment account management service providers can include modules 214, comprising online secure financial account and information system(s) 216, which can for example be implemented by or on behalf of one or more banks or other financial institutions (FIs) and which can comprise one or more secure data bases 218.

Client application/customer wallet management application(s) and/or server(s) 220 can provide any execution, support, data storage, or other functions useful in hosting or otherwise managing virtual wallets and/or data processing applications which can wholly or partially reside on any desired client or customer device(s).

Server(s) 112, 214, and user devices such as laptop(s) 204, desktop(s) 206, and/or other mobile or stationary computers 102, 202, and/or any mobile devices such as palmtop, tablet, or other mobile communication device(s) 202, can be implemented in any desired form, including any suitably-configured special or general purpose data processing devices of any type.

Applications 104 managed or implemented at 102, 106, 116, 214, 216, etc., can be supported by any of a wide variety of third- or fourth-party service providers. For example, in the case of online and/or POS purchase transactions, third-party loyalty managers or service providers can provide or support suitably-configured data processing.

Secure memory(ies) 218 administered or otherwise managed by servers 112, 214, etc., can store any desired or required sensitive information, including personal information, preferences, and other data associated with users 10, etc., and account information associated with personal and/or business payment, savings, rebate accounts, etc.

Communications via hardwired and/or wireless network(s) 250 can be provided in any suitable form, using any suitable protocol(s), etc. In the context of a system such as that shown at 100 in FIG. 2, security and over-the-air (OTA) communications infrastructure(s) can be provided by any suitably-configured servers or platforms 260.

OTA and other communications (sub)systems 260, wallet management application(s) 220, and other components of system(s) 100 can be configured to support multiple hardware and software systems. For example, specifically-configured wallet management components 220A-220D, TSM interfaces 120', and communications components 260A-260E can be configured for communications with various hardware devices, including for example Apple, Samsung, Blackberry, Nokia, and other smartphones; SE in the forms of SIM cards, SD cards, etc; and other devices in accordance with GP, GMS, 3G, and other communications protocols.

For example, a suitably-configured wallet manager application 220 can be controlled by a user 10, for purposes of setting up an account with any one or more financial institutions, accessing an account to complete a payment transaction or down-load a pre-paid "card present" payment, token, etc., by accessing a suitably-configured user interface (UI) via input/output device(s) of a suitably-configured user device 102, directly or through online-banking application(s) 216, etc., for purposes of providing, for example, Common and therefore more efficient user experiences across a number of financial institutions (by accessing sub-applications 220A-D, etc.);

Selection and lifecycle management of desired virtual/physical wallets from a defined or definable list ("physical" wallets meaning, in this context, independently-administered account information stored on SEs and other device(s) 102 provided by smart-phone and other OEMs; "virtual" wallets in this context including data sets administered by payment account holders such as banks, credit card, and/or loyalty institutions);

Preference setting and review of selected or otherwise eligible wallets, deletion or de-registration of wallet(s), nicknaming of accounts and account attributes; notifications;

Selection and management of instruments, including for example provisioning of credit, debit, reward, and/or loyalty accounts;

Setting profile and/or other user preferences;

Accessing and utilizing other value-added (ancillary functions offered by the hosting FI, etc.)

Interfacing with third party service providers, etc.

Setting and recovery of user identifiers and authenticators, including for example personal identification numbers (PINs), passwords, etc.;

License and/or other consents or acknowledgements by a contracting user 10;

Accessing service center or other help/contact information;

Access, set up, and use pay and tap and peer-to-peer (P2P) transfer functions;

Loyalty program setup and redemption, etc.

In embodiments such as that shown in FIG. 2, secure memory(ies) 218 can be provided as 'cloud-based' secure elements including any one or more unified, or physically or virtually separated, secure database(s) 218A, 218C, etc., and can provide:

Logical and or physical secure element functionality similar to, for example, hardware SEs provided in SIM and other fixed and/or removable memory(ies) used on smart phones and other mobile or stationary devices 102. Such SEs can be used to store account identifiers and other information pertaining to credit, debit, coupon, reward, and other loyalty accounts associated with a user 10 of an optionally specific device 102

Encryption and other logical security functionalities

User accessibility through wallet synchronization and management services and engines 220, etc.

User, account, and other preferences and user selections, including for example use of nicknames, telephone numbers, and other identifiers for convenient and/or secure user access to account and transaction information;

Synchronization of account and other information across accounts, wallets, etc., associated with various accounts and financial institutions, etc.

Card-present (i.e., pre-paid or pre-authorized) payment or transaction tokens. Such tokens may, for example, be created by allowing a user 10 to access his account an FI and to sequester, segregate, or otherwise identify and optionally set aside pre-authorized payments to be used in later transactions, at the convenience of the user 10;

Redemption and rejection records pertaining to offers, promotions, etc.

In the embodiment(s) of FIGS. 1 and 2, purchaser financial data may be provided to a mobile communication device or other device 102, e.g., for use in initiating or completing a proposed transaction at a merchant POS 114, website 270, etc., by any one or more data prep system(s) such as a purchaser wireless device(s), remote desktop computer(s) operating via one or more on-line banking (OLB) systems, and/or any one or more partner sites operated by financial institutions and/or other service providers. Following receipt by the mobile communication device, such purchaser financial information may be stored in a secure environment such as an SSD logically resident in a cloud-based system operated by a bank or other financial institution or service provider.

As previously noted, particularly advantageous features of systems and methods in accordance with the disclosure is that they may be implemented using any suitable communications technology(ies), including for example any one or more of the internet, the PSTN, or other wired and/or wireless connection, and stored, card readers, NFC devices, bar codes, scanners, Bluetooth devices, etc., in any suitable or desired combinations.

Such communications technology(ies) may be used to transfer or otherwise share data between the various systems components in any desired manner. In some embodiments, for example, as shown in the various figures, an SE, and/or any other components, comprise on- or over-the-air (OTA) capability. In these and other embodiments, transactional and/or other financial data (such as, for example, accounts adapted to receive payment in a transaction) may be provided by the SE to any one or more vendor or merchant point-of-sale (POS) systems, via any suitably secure communications link(s), including the PSTN and/or wireless connections, etc. Merchant POS systems can pass the same and/or other transaction information, including for example data identifying purchased items and/or services, price information, quantity information, etc. to one or more purchaser devices such as a smart phone, SIM card, and/or NFC device.

Ancillary functions such as updates, analytics, etc., to or for any suitable or required components of systems 100, 112, can be provided by update, analytic, and other servers 235, 236, etc.

In various embodiments, purchaser or other processing request device(s) 102 can communicate with cloud-based SE(s) 218, 106, etc., using OTA capabilities to access and otherwise make use of purchaser information, including for example information relating to one or more user payment accounts, in order to complete and/or otherwise advance a purchase transaction. For example, corresponding account balances can be checked, a purchase authorized, funds to be used in payment can be pre-authorized, and appropriate credit and/or debit records created for real-time and/or batch processing. Such processing can be processed by cloud-based SE acting alone and/or in cooperation with one or more third-party systems, including for example one or more financial institutions maintaining or otherwise administering credit and/or debit accounts associated with the purchaser associated with the purchaser device.

FIG. 3 is a schematic diagram showing an embodiment of a system 10 in accordance with the disclosure, comprising elements of (sub)systems 100A, 1008, of FIG. 1, and associated processes. The embodiment shown and described in FIG. 3 is consistent with those of FIGS. 1 and 2, and provides further details of implementation options.

In the embodiment shown in FIG. 3, a user 10 of a purchaser or other client request device 102 can obtain a pre-paid or other pre-authorized secure card-present token by interacting, via network(s) 250, with TSM(s) 120 and acquirer and FI servers 112, 116, directly or via merchant POS system 114.

Among other advantages, the use of a system 100 such as that shown in FIG. 3 enables a user 10 of a transaction device 102 to acquire a card-present token without requiring an SE on the user's device 102; such a token may, optionally, be stored on behalf of the acquiring user 10 in a cloud-based SE 116 such as one operated by or on behalf of an issuing FI. As noted previously the security of such token may be enhanced by the association, as described herein, of a plurality of secret or otherwise secure identifiers with the token. Such identifiers may, for example, be uniquely associated with the user 10 (whether an individual or entity), a transaction payment account, and the specific device 102 used to acquire the token. Such tokens may, in addition, be used for online transactions (e.g., mobile- and/or other electronic commerce, or "e-commerce" or "m-commerce" respectively). Among the many advantages enabled by systems, methods, and programming products in accordance with the disclosure is that in some embodiments purchasers may be enabled to complete transactions at merchant/vendor POS systems using devices as simple as suitably-programmed NFC devices (such as an NFC handset). This can, for example, eliminate the need for purchasers to acquire, safeguard, or otherwise use SEs, or keep them on their person. This can, for example, reduce opportunities for data and/or identity theft, or other abuse.

In alternative embodiments, as explained more fully below, "card present" and other transactions can be conducted, or otherwise implemented, using SEs provided in the form of encrypted and/or otherwise secure, pre-authorized payment tokens stored on mobile devices such as smart phones, tablet computers, and other PDAs. Such SEs may be provided using dedicated firmware embedded within the PDAs, in removable devices such as SSDs and other forms of SIM cards, and/or any other suitable form, and may comprise all data required to initiate and complete an electronic transaction, or one or more required elements, including for example account identifier(s) and/or pre-authorized purchase amounts.

Among advantages offered by embodiments of the invention in which such SEs and/or tokens are provided in firmware or other embedded devices, rather than removable devices, in view for example of current communications business practices, is that purchasers, and financial institutions and other account issuers and/or payment processors, can be relieved of sometimes unnecessary or onerous relationships with SE issuers, with additional benefits of reduced costs and system complexity, and improved customer relations. For example, by transferring secure financial data from a SIM on a purchaser's mobile device to other memory on a PDA, and/or to secure remote memory devices, dependency of any or all of purchasers, account issuers, and payment processors on mobile network operators, or mobile network carriers (MNOs) can be eliminated or reduced. By transferring such data from memories embedded on mobile devices such as smart phones or tablet computers, dependence of such parties on OEMs and/or handset manufacturers can be eliminated or reduced. By transferring such data from SD cards, risks and inconveniences associated with swapping cards, manipulating card sleeves, distributing cards, low memory capacity, and purchaser confusion can be eliminated or reduced.

Among advantages offered by embodiments in which such SEs and/or tokens are provided on removable devices such as SIM, SD, or other memory cards, is that personalized information associated with one or more particular users, including for example personal identification or authentication codes, may easily be transported from one device to another.

A further advantage of either type of embodiment is that secure financial information (e.g., a purchaser's virtual wallet) can be conveniently available for online (e.g., e- or m-commerce) transactions.

As will be apparent to those familiar with the disclosure, a large number of further advantages are, or may be, enabled by the disclosure.

FIGS. 4A-4D are schematic diagrams showing further embodiments of system architectures suitable for use in implementing secure storage facilities and other components in accordance with the disclosure, and associated processes and information. In each of the embodiments, the illustrated payment systems comprise user payment, transaction, or other communication devices 102, FI or other adjudication systems 110, and third-party service providers such as payment or other application processors 112, TSM and other communications service providers (e.g., telcos) 120, etc.; and in some cases merchant POS or other transaction systems 114.

Each of the embodiments shown in FIGS. 4A-4D further shows mobile banking and/or other data processing application(s) 104, and memory(ies) and SEs 106, 116, and optionally 118. As may be seen in the FIGS. 4A-4D, application(s) 104 and memories and SEs 106, 116, 118 may reside on purchaser device(s) 102. Alternatively, as previously noted In the embodiments shown in FIGS. 4A-4D, a requesting client device 102 is shown in the form of a PDA 202 such as a smart phone or other wireless mobile communications device. An adjudicating server 110 in is shown in the form of an FI system comprising multiple servers, and/or server applications (which may, for example, be implemented physically on any one or more separate server machines, and/or in various virtual combinations single data processing devices), including a mobile banking web server 410; an authentication server 412; backend systems 414 configured to provide encryption services and other functions ("Backend Systems); and a support services provider 416 configured to provide hardware services module (HSM) functions, encryption key management services (KSM), TSM functionality; and account management services. Third party service provider system(s) 120, 122 "Partners", comprising, e.g., communications and payment/transaction processing service provider system(s), provide telecommunications, transaction processing, and any other required/desired third-party service functions.

Among other features, in the embodiments shown in FIGS. 4A-4D:

(104A) represents a general banking or other payment or data processing application executable by the PDA 202 or other client system 102, operable to, for example, enable access to wallet application (104) and to provide other remote banking functions, to enable a user to access general banking and/or other payment processing application executable through use of PDA 102, 202, and input/output devices 103;

(104B) represents a wallet application executable by the PDA to enable access to one or more payment or other financial accounts associated with the PDA, or a user or a manager or other administrator thereof. Application 104B can be implemented, for example through a user interface layer, or application, of a wallet application executable by the PDA;

(432) represents a token manager provided through the FI 110 from, for example, an application/integration tier, to interact with the FI, via telecoms and other TSMs 120 as needed or desired, to preload or otherwise provide the PDA with encrypted or other virtual payment tokens, and to facilitate loading/access of such tokens into the SE application (106, 116) for use in payment or other data processing transactions. Such a manager 432 can be configured to reduce or eliminate transaction network latencies by, for example, working in conjunction with presentation tier token manager (3), and providing EMV tokens and cryptograms across all payment types or instruments for POS transactions.

(116) represents an SE implemented on a SIM card, and/or on other secure and optionally removable memory of the PDA 102, 202, the SE comprising an applet and/or other executable code or data suitable for use in securely generating transaction and other data sets suitable for use in initiating, negotiating, and/or consummating data processes such as financial transactions at, for example, merchant POS devices 114, and/or for otherwise enabling access by a user of the PDA 102, 202 to account information controlled by the FI "Host" 110. As explained further herein, SE 116 can provide memory for storing authentication data representing multiple independent identifiers, or credentials, including for example one or more identifiers associated with each of a user 10 associated with a device 102, the device 102 itself, and account or other application information associated with the application 104 adjudicating server 11, or third party server 120, etc. Both identifiers and secure process tokens such as pre-paid transaction tokens can be stored. Such tokens and credentials can represent or otherwise be associated with a wide variety of accounts or other application-related data sets, including for example, savings, checking, credit, debit, rewards, gift cards, and/or other payment credentials can be stored in an SSD created exclusively for an FI on the SIM card or other secure memory.

(110) represents an authentication or adjudication server configured to authenticate the user 10, PDA "Device" 102, and application or other information such as an account number, and thereby authorize or otherwise enable secure access by the Device 102 to FI services hosted by 110 over the web or other network 250;

(430) represents a mobile application server such as a platform integration server of, or otherwise associated with, the adjudication server 110, adapted to authenticate client device(s) 102, user(s) 10, and other credentials by comparison to known authorized devices 120, and thereby enable secure access by the Device 102 and/or user 10 to FI or other data processing services available through the server 110 over the web or other network 250;

(412) represents a presentation layer of, or otherwise associated with, the adjudication server 110, for banking or other applications provided by the FI;

(418) represents a gateway, such as an XML gateway, configured to serve as an interface between the adjudication server 110 and merchant payment processor services (112, 420) "Card Systems (TSYS)";

(122) Represents a root TSM provided by a third party service provider such as a telco or other communications service provider, configured to provide services such as creation of SSDs and execution of scripts or other instruction sets provided by the SP TSM (416), or otherwise at the request or authorization of the SP TSM (416);

(416) represents a service provider TSM of, or otherwise associated with, the adjudication server 110, configured to, for example, push and/or otherwise make an SE applet (116) available to the PDA "Device," change UUID/passcode and/or other authorization/authentication information associated with user(s) and/or administrator(s) 10 of the PDA 'Device;' and provide and/or otherwise make available to the PDA "Device" updates and/or replacements for data associated with the SE applet (116), banking application (104A), and/or wallet application (104B), etc., SP TSM 416 can further be configured to provide books of records for credit, debit, and/or other accounts used in transactions, provide and/or otherwise manage accountholder and/or other personal data, such as card "embossment" services or management, and execute updates and/or other changes related to transaction accounts or services, etc.; and otherwise interact with TSYS system(s) (420);

(418) represents FI application(s) and/or other functionality(ies) configured for communications between the FI adjudication system 100 and TSYS service(s) (420) and other third party services 112, 114, and including for example telcos and other TSMs 120, 122, including for example a gateway such as an XML gateway.

(420) represents credit card payment and issuance process (TSYS) service(s) configured to provide books of records for credit, debit, and/or other accounts used in transactions, provide and/or otherwise manage accountholder and/or other personal data, such as card "embossment" services or management, and execute updates and/or other changes related to transaction accounts or services, etc. Further functionality provided by a server 420 can include for example maintaining, coordinating, and/or otherwise administering books of records for credit, debit, loyalty, gift, and other payment accounts held or administered by third parties; creation and maintenance of mobile accounts and tokens, creating and/or sending account-holder personal data such as card embossment preferences, etc.; and facilitating account updates;

(414) represents FI backend services of, or otherwise associated with, the adjudication server 110, responsible for services such as insertion of protocol requirements into personal data, such as Europay, MasterCard, Visa (EMV) formatting compliance requirements, etc. Such services can, for example, be provided by PTB/CIS applications responsible for inserting EMV or other payment keys into personal data associated with token and/or transaction data sets;

(434) represents a customer support application provided, in the embodiment shown, by a third party service provider and configured to provide, for example, monitoring of commands executed on PDAs, etc.; and (422) represents a web services tier of services 414 used for example to facilitate communications with PDAs 102, 202 at the presentation tier.

Figure 4A:
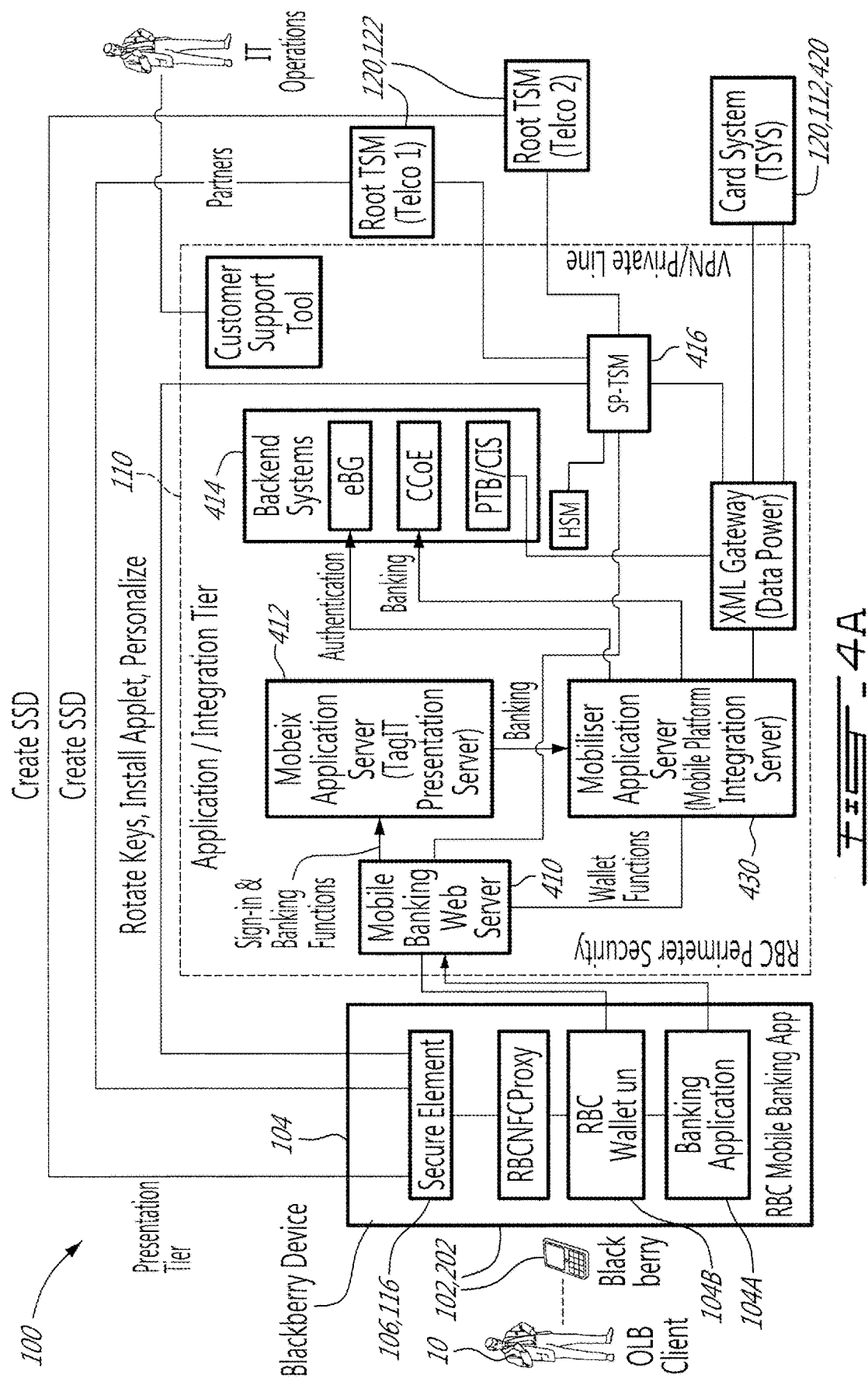
Figure 4C:
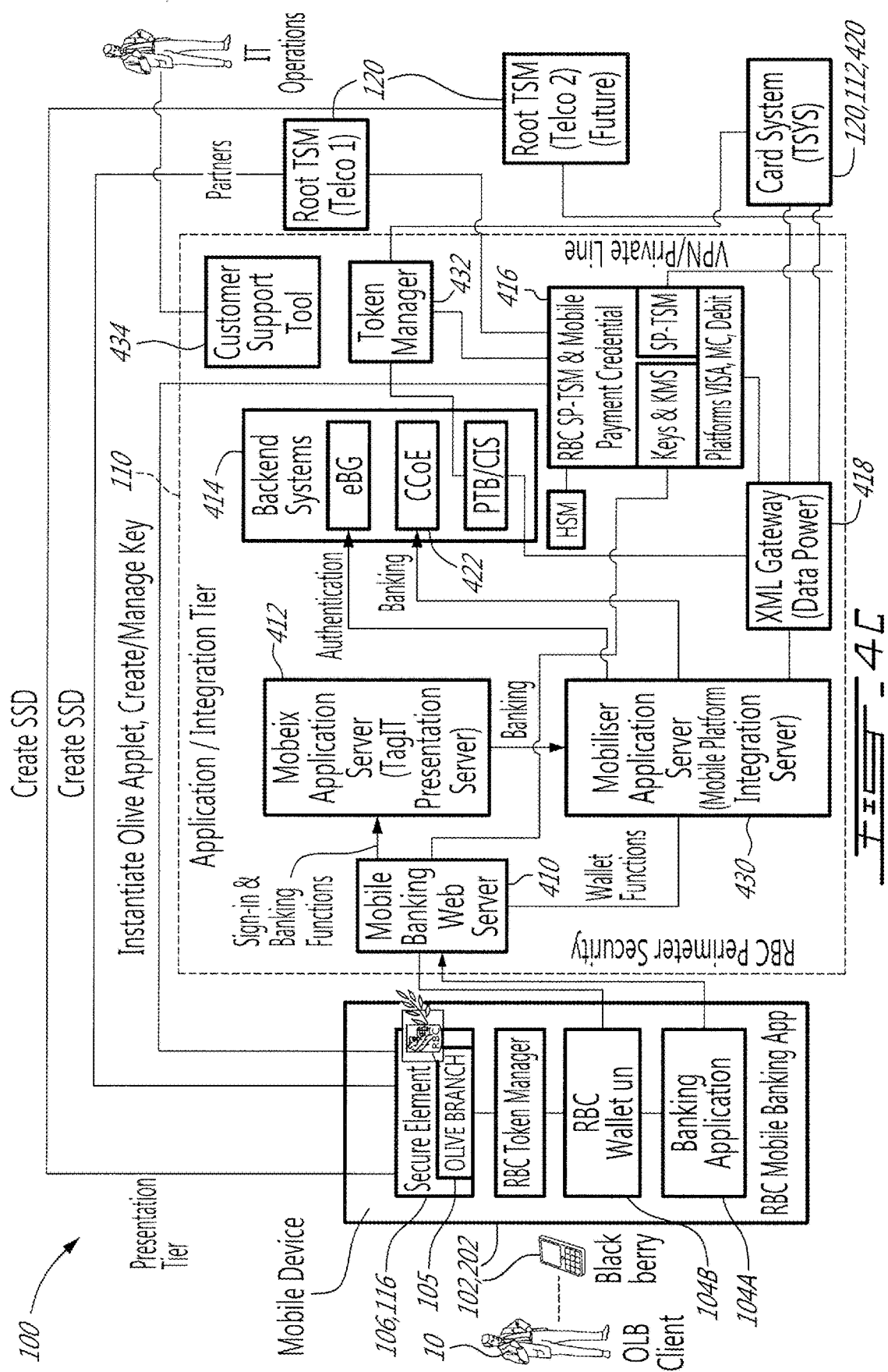

Among other functions, processes performed by systems 100 of FIGS. 4A-4D can include, as shown with reference to FIG. 4B:

at (A), user-initiated and other functions originated at the presentation tier, including for example, requests for personal/account creation or changes, including for example any or all of account holder name, address, password, UUID, and/or payment account information, to be used by, stored by, and/or otherwise associated with a SE applet (116), wallet application (104B), and/or banking application (104A) are passed through the platform integration server (430) to the SP-TSM (416) for execution, in order for example to help ensure that only authenticated users are enabled to perform sensitive functions; the FI application server 410 forwards a request for personal/account creation or change, including for example any or all of user, device, and/or application-related identifiers, such as account holder name, address, password, UUID, and/or payment account information, to be used by, stored by, and/or otherwise associated with a SE applet (116), wallet application (104), and/or banking application (104A) to the SP-TSM (416) for execution;

at or after (B) the SP TSM (416) generates a request for the Root TSM (120) to execute any actions needed to implement the request; including for example generation of an SSD and execution of any required scripts, and causes the request to be forwarded to the Root TSM (120);

at (C) the Root TSM (120) executes any necessary actions required to implement the request generated at (B) on the PDA "Device" 102, 202, by for example creating or updating an SSD comprising data representing all desired independent identifiers on the SE (116);

at (D) the SP TSM 416 installs the SE applet (116), and performs and required or desired personalization functions, by for example causing the Root TSM (120) to execute suitable instructions;

at (E) the SP TSM 416 provides key management and optionally other desired encryption functions; and at (F) device eligibility checks and polling for command execution status are performed, as for example by the Root TSM 120.

In the architectural embodiments shown in FIG. 4A-4D, a user payment device level ("Presentation Tier") of functionality can be provided for implementation on a PDA such as a smart phone or other wireless mobile communications device 102, 202. An application/integration tier implemented by for example an FI server system 110 can be provided using multiple servers, and/or server applications 410, 412, 414, 416, 418, 430, etc., (which may, for example, be implemented on any one or more separate server machines, or on a single data processing device), including a mobile banking web server 410; a Mobile Platform Integration Server "Mobiliser Application Server" 430, a token manager 432; a customer support tool 434; backend systems 414 configured to provide encryption services and other functions ("Backend Systems"); and a support services provider 416 configured to provide hardware services module (HSM) functions, encryption key management services (KSM), TSM functionality; and account management services (Platforms). Third party service provider system(s) 120 "Partners" or "External Vendors" provide a variety of support functions, including for example communications and payment/transaction processing services, customer support, etc., as well as any other required/desired third-party service functions.

As will be understood by those skilled in the relevant arts, and as shown for example in FIG. 4D, FI and/or other payment servers, or systems 110 in accordance with the invention have, among other features, the ability to virtualize operations of a SIM-based Secure Element (SE) 116, and can be configured to support all suitably-compatible payment schemes, including automated clearing houses (ACHs) and a wide variety of others. Such payment servers/systems can manage general and cryptographic processes in the HSM. Sensitive applications and application data can be stored and secured in firewalled and and/or other secure issuer environments; any and all data may be segregated within any one or more desired databases, using the most sophisticated and secure database systems software(s).

Services provided by such servers/systems can include:

Hardware based Cryptographic operation using HSM servers 416, etc.

Key management operations

Generation of payment credentials QVSDC, MSD DCVV, etc., for all card/payment types, including Debit, Gift, Visa, MC and/or others Some of the terms used in FIGS. 4A-4D, and others, include:

| | |
|---|---|
| OLB | On-line banking |
| OTA | Over the air, e.g., wireless |
| TSM | Trusted service manager |
| SP-TSM | Service provider TSM |
| TSYS | Merchant and/or card payment processor system |
| CCoE or CCCoE | Common component center of excellence |
| JSR | Java specification request(s) |
| PCI | Payment card industry |
| RBC | Financial institution and/or other financial services provider |
| Telco | Telephone and/or other communications service provider |

FIGS. 5A and 5B illustrate example processes for completing data processes, in the form of electronic transactions using secure element(s) 116 and devices 102, 202, 114, 112, 420 etc., to effect payment according to, and consistent with, various aspects and embodiments of the disclosure. While the example processes described herein may make reference to specific communication technologies and standards/protocols now in widespread use, embodiments of the invention(s) are not necessarily restricted (unless context clearly dictates otherwise) to such technologies and standards/protocols. For example, the embodiment shown in FIG. 5A makes use of a Near Field Communication (NFC) link 510 to exchange data representing payment information between customer and merchant devices 102, 114, respectively, while at 520 the embodiment of FIG. 5B utilizes optical scanning devices and barcodes and/or quick response (QR) codes. As will be understood by those skilled in the relevant arts, other communication technologies consistent with the disclosure, either currently existing or conceived in the future, are suitable as well.

According to the example embodiment of FIG. 5A, a customer may effect secure payment for a transaction with a merchant Point of Sale (POS) terminal 114 in the following non-restrictive manner. As described herein, a customer's mobile communication device/PDA 102, 202 may comprise one or more preinitialized secure elements 116 (comprising credentials and other data associated with the respective user 10, the specific device 102, 202, and one or more user accounts, or the like, programmed or stored thereon) with purchaser financial data representing one or more different accounts or payment methods (such as credit cards, debit cards, coupons or other value added services) associated with one or more FIs and/or other authorization adjudications 110. Such purchaser financial information stored in the secure element 116 may thereby be made available automatically and/or on demand for use by the customer 10, device 102, adjudication server 110, and/or other devices or components of system(s) 100 to authorize and complete transactions. In various embodiments, such information may, through the use of encrypted or otherwise secure data sets representing prepaid or pre-authorized payment tokens, be available for use in wireless (e.g., NFC) and other POS transactions regardless of the state of any communications networks 250, etc., enabling communications by the mobile communication device with a remote networked resource such as an FI's OLB system 110, etc.

At 801 in FIG. 5A, a customer or other requesting client or user 10 may, in order to effect payment for a transaction, be enabled to select and effectively access a secure data set representing a pre-stored card or other account using an application program 104, 104A, 104B, or other user interface that has been installed on a customer mobile device, such as a smart phone or tablet computer 202, and the like. After input of suitable account information selection(s), the customer mobile device 102, 202 can transmit the customer's selection to the secure element 116 and/or adjudication server 110 for lookup into the customer's securely stored purchaser financial data and any other credentials. In some cases, information transmitted to the secure element 116 and/or server 110 may contain sufficient information so as to identify a selected payment method, but without providing complete details (e.g., purchase amount), some of which may be of a sensitive nature that would leave the customer vulnerable if intercepted by third parties. Transmission of potentially sensitive customer information over the air may therefore be reduced, which tends to provide the customer with increased security against third party threats.

For example, the mobile device 102, 202 may generate and/or transmit signals representing a portion of a unique number or code associated with a stored credit or debit card (e.g., last 4 digits, but preferably sufficient information so as to unambiguously identify the selected card in the stored purchaser financial data). As another example, the customer may be able to create alternate designations (such as "nicknames") or generic (e.g., serialized) account numbers used to differentiate different stored accounts or payment methods from others. Such nicknames could refer, e.g., to the card issuer (e.g., "Visa" or "Mastercard"), financial institution (e.g., "RBC account"), type of payment method (e.g., "credit card" or "checking account"), and any combination of these example descriptors.

At 802, so as for example to further increase security of data transmission between the secure element 116 and the customer mobile device 102, the secure element 116 may generate and employ a secure session ID enabling the mobile device 102 to establish a secure session between the two devices 102, 114. The secure session ID generated by the secure element may be particular to the transaction being completed by the customer and transmitted in each data packet exchanged between mobile device 102 and secure element 116 in order to authenticate the origin of the data packets for use in, for example, confirming and/or otherwise authorizing transactions, facilitating book- and account management, etc.

As part of initiating and otherwise advancing a secure session between the customer mobile device 102, 202 and merchant device 11, once secure access to the secure element 116 has been established, at 803 the customer 10 may transmit data to a merchant POS system 114 by, for example, positioning the customer's mobile device 102, 202 sufficiently close to the merchant POS 114 so that the merchant POS device 114 is within the broadcast range of a near field communication transmitter housed in the customer mobile device 202. With respect to existing types of technologies and/or standards, some NFC transmitters may have broadcast ranges on the order of centimeters only, for example, less than 10 centimeters or, in some cases, as little as between 1-5 cm. Accordingly, establishing a communication link between customer mobile device 202 and merchant POS device 114 may involve physical or near physical contact between these devices (sometimes referred to as a device "tap" or "tapping").

To effect payment, the merchant POS device 114, may transmit purchase information or data to the customer mobile device 202 over the NFC or other communication link 510. Such transmitted information may include, at a minimum, a total payment amount owing. However, other types and/or kinds of purchase information may also be transmitted, such as an itemized purchase breakdown and value added services like coupons or discounts, as well as other transaction-specific information such as a store name or location, or other merchant identifiers or particulars, date and/or time particulars, transaction counts, and others that will be apparent after familiarization with the disclosure.

On receipt by the customer mobile device 202, some or all of the purchase information exchanged over the NFC communication link 510 may at 804 be relayed to the secure element 116 and/or related applications, for payment processing. The secure element 116 may then generate and transmit any required secure communications packages for transmission to the POS 114 and/or remote FI device(s) 110 to effect payment using selected currency, loyalty, and/or other account(s), using, for example, suitably-formatted cryptogram(s). In some embodiments, the secure cryptogram may comprise encrypted data or program code that provides a complete instruction set for the merchant POS to clear the transaction with an issuing financial institution associated with the selected method of payment. Thus, for example, at least the customer's selected payment method and the total payment amount may be encoded into the secure cryptogram. As described in more detail below, for such entity(ies) that has/have capability to decode the cryptogram, the payment instructions encoded therein may be accessed and executed, e.g., by the financial institution debiting (or crediting) the customer's selected card or account by the purchase amount. Other transaction or identification information, such as customer, device, account, and/or other credentials, an application transaction counter, or a unique derivation key, may also optionally be encoded without limitation into the secure cryptogram.

At 805, after suitably-configured transaction data is received from the secure element 116, whether located "in the cloud" (i.e., in memory associated with a remote networked memory resource such as an adjudication server 110) and/or on the mobile device 102, 202, the customer mobile device 102, 202, using for example a suitably-configured mobile payment application 104, can relay the data, e.g., via secure cryptogram, to the merchant POS 114 over the NFC communication link 510 established between the customer mobile device 102 and the merchant POS device 114. The secure cryptogram may then be passed from the merchant POS to an acquirer or other transaction processor 112 and then to one or more associated payment processors 420, such as one or more FI systems 110, for verification or other adjudication. For example, the receiving financial institution 110 may be equipped with software or other application program for decoding the secure cryptogram and extracting the payment instructions encoded within. Once decoded, the bank or financial institution is able to perform a number of different verifications before executing payment. For example, the bank or financial institution may verify whether the customer 10 does have an account or has been issued a credit card as identified in the cryptogram, and that sufficient funds are present so as to cover the amount of the purchase, and that the specific device 102 used to generate the transaction request is an authorized device. Other verifications may be possible as well, such as transaction counts, geographical checks (e.g., as a fraud countermeasure) are possible as well.

At 806, if the account/transaction information is verified, the bank or financial institution may authorize and/or otherwise process payment as requested, and send notification to the merchant POS 114, 112 that the transaction has been approved. At that point, the merchant POS 114 may send notification to the customer mobile device 102 over the NFC communication link 510 (typically signals useful for generating a visual, auditory, and/or vibratory alert are used) that the transaction has been approved, at which point the customer mobile device 102 may be withdrawn from the vicinity of the merchant POS 114 in order to discontinue the NFC communication link 510 and end the information exchange. Transaction closing processing, such as printing and/or storage of receipts, may then occur.

Alternatively, if a financial institution or an adjudicator 110 acting on its behalf unable for one reason or another to verify, or authorize, a requested transaction (e.g., because the customer has insufficient funds to cover payment, the issued credit card has expired, no matching credit card or account number can be located), the FI may decline the transaction. In such case, the FI may then transmit an appropriate notification to the merchant POS 114, which may relay suitable information to the mobile customer device 102 (e.g., using a different visual, auditory, and/or vibratory alert, or no alert at all). In such cases, the customer may be allowed to re-attempt payment using the secure element 116 by selecting a different form of payment, or to terminate the transaction without completing the purchase, or any other processing option.

FIG. 5B illustrates an embodiment of a process for effecting secure payment, as an alternative to the embodiment shown in FIG. 5A, which utilizes barcodes or QR codes instead of device tapping or other NFC functions to exchange information between a customer mobile device 102, 202 and a merchant POS 114. The two processes may share several elements or aspects in common and therefore description may be abbreviated in some respects for clarity. Specific differences may be highlighted.

According to the embodiment shown in FIG. 5B, at 851 customer selects a payment method using an application program 104 or other user interface on a customer mobile device 102. The customer mobile device 102 sends data identifying the selected payment method to a secure element 116 on the device 102 and/or over the air, which in turn causes generation and transmission of a secure session ID for the transaction to the customer mobile device 102. These actions may be performed substantially as described herein with respect to FIG. 5A.

After establishment of a secure session between customer mobile device and secure element, at 853 the secure element 116 may select a payment protocol and generate a secure cryptogram based on the selected payment protocol. For example, suitable payment protocols for generation of a cryptogram may include SMSD, DMSD, and EMV without limitation. The securely generated cryptogram may include purchase information such as that described with reference to FIG. 5A.

Once generated, the secure element 116 may cause release or transmission of the cryptogram to the customer mobile device 102, and at 853 the cryptogram may be converted using an appropriate application program into a 2D graphical representation, such as a barcode or a QR code 522, into which the purchase or transaction information has been uniquely encoded using, for example the PDF 417 protocol. At 854 the barcode or QR code 522 may be rendered on a display of the customer mobile device 102 and presented to the merchant POS device 114 for scanning by a suitable input device coupled to the merchant POS.

At 855, once the customer mobile device 102 and merchant POS 114 have exchanged information, the barcode or QR code 522 (and the transaction information encoded therein) may be relayed to an adjudicator/financial institution 110 and/or card issuer 420 by way of an acquirer for verification. Transaction verification (acceptance or decline of the transactions) by the bank or financial institution, or other adjudicator, may be handled as described herein for FIG. 5A.

Use of secure cryptograms as described herein (which in some embodiments may alternatively be referred to as "tokenization", bearing in mind that tokens as used herein may comprise such secure cryptograms and other data used to secure a transaction or authorization, including for example a hashed version of a user identifier, unique device identifier, URL or other routing information, etc.) may provide a number of advantages in the secure processing of payments and other data processes. For example, secure cryptograms may enable processing of transactions any time that connectivity (e.g., wireless, WAN, LAN, cellular) between a customer mobile device and the secure element is established, whereby the customer is thereafter able to access purchaser financial data stored securely therein, whether a network 250 or other connectivity is available or not. While described primarily as over the air (OTA) connectivity, such embodiments may make use of physical, hard-wired communication networks, such as PTSN, cable, fibre optics, as well. As mentioned, use of secure element(s) 116 in this manner may reduce or eliminate reliance on secure elements 116 included within a mobile device 102, 202, which may be proprietary in nature and/or associated with a teleco or other third party 120, 122, etc.

As mentioned, use of secure cryptograms as described herein may also enable processing of transactions, in some cases, even where connectivity between a mobile device 102, 202 and an adjudicator 110 cannot be established, or is unexpectedly terminated. For example, according to various embodiments, a secure session may be established between an FI 110 or other server and a customer mobile device 102, 202 in advance of a contemplated transaction in order to obtain pre-authorization for the transaction up to a certain specified amount. Thus, the customer 10 may select and send a payment method and pre-authorized purchase amount to the secure element, which in turn may generate and send a corresponding cryptogram to the mobile device for that payment method and preauthorized purchase amount. The cryptogram may then be stored on the customer mobile device 102, 202 for later use in a transaction.

With the cryptogram or other token, or other data set or structure suitable for use by a requesting customer device 102, or useful for generating such a token, resident on the requesting customer device, transactions may proceed as described with reference to FIG. 8A or 8B, regardless of whether a session with an FI and/or adjudicating server 110 is available. Instead of establishing a connection to a server 110, etc., the mobile device 102, 202 can access the stored cryptogram or token in a secure element 116 or memory 106 of the mobile device for the pre-authorized amount, and establish an NFC or other communication link 510, 520 etc., with the merchant POS (e.g., FIG. 5A) or generate a corresponding barcode or QR 520, 522 code to be scanned by the merchant POS input device (e.g., FIG. 5B). After receipt by the merchant POS 114, the secured token may again be relayed to the bank or other financial institution, or other adjudicating server 110, for verification and transaction execution. Provided the pre-authorized amount is not exceeded, the bank or financial institution will generally verify the secure cryptogram as described herein.

In such cases transaction information may be deleted or modified in order to reflect consummation of the transaction. For example, amounts available for payment in further transaction(s) may be deducted from stored available transaction amount(s), and corresponding data records modified.

As will be further understood by those skilled in the relevant arts, prepaid soft tokens and/or other secure transaction data sets stored in SEs 116 on customer devices 102 may be provided in multiples, and may identify any of a wide variety of pre-authorized transaction information, including but not limited to preauthorized transaction amounts, pre-approved merchants and/or classes of transactions, etc.

FIGS. 6A and 6B illustrate embodiments of example processes, in accordance various aspects of the disclosure, which may enable "person to person" (e.g., mobile device-to-mobile device) (P2P) exchanges using embodiments of secure element(s) as described herein to effect or facilitate electronic data transactions, including transfer or pre-paid or other value tokens, from one device to another. Such P2P interactions may be based on any suitable or technologically expedient or convenient communication technology(ies), such as Bluetooth, RFID, or NFC, without limitation.

At 901, in an example P2P exchange such as that shown in FIG. 6A, a customer or other user 10 of a smart phone or other mobile device 102, 202 equipped for NFC or other secure, short range communications may enter into the vicinity of a merchant's store or place of business.

Upon the customer 10 entering, at 902 the customer's mobile device 102, 202 may connect wirelessly with an application program or other backend software running on a communication network 250 set up in the merchant's store or place of business. For example, the customer mobile device may be Bluetooth enabled and connect to a suitably configured Bluetooth master device (merchant server), although other communication technology(ies) and protocol(s) may be suitable as well. When the customer mobile device has connected to (or is "paired" with) the merchant network, the customer mobile device 102 is able to access and display data representing a menu or other listing, e.g. a catalogue of items or other inventory for sale, either on the merchant's premises or through other means, such as mail order, to the customer on a display of the mobile device. Items other than sale inventory, such as value added services (coupons, discounts) may also be accessed by the customer mobile device 102. For example, such value added services may be offered as part of a promotion or in response to past or current customer behaviour, e.g., taking factors such as frequency and quantity of purchases into consideration.

At 903, as the customer 10 virtually and/or physically browses the merchant's merchandise, the customer is able to select one or more items for purchase using a menu selection feature on the mobile device 102, 202. When the customer has finished selecting items for purchase, an application running on either or both of the devices 102, 112 can generate data representing the desired order can be submitted to the merchant using any of the secure payment methods described herein, e.g., using NFC link(s) 510 (FIG. 5A) and/or barcode/QR code(s) 520, 522 (FIG. 5B) to exchange data representing payment information with the merchant system 114, 112, etc.

At 904, secure payment data sets assembled or otherwise generated by the customer device may be routed to the corresponding bank or financial institution 110 for adjudication, verification and/or execution. Processes suitable for use in performing such verifications are described also with reference to FIGS. 5A and 5B above.

If the customer's secure payment is accepted by the corresponding bank or financial institution 110, etc., (with notification thereof), at 905 the customer's order data may be transmitted from the customer mobile device 102 to the merchant server 112 for closing of the transaction. For example, staff at the merchant's store may prepare the customer's items for checkout according to the order, which may involve collecting items from visible inventory stocks, backroom stores, or potentially arranging for mail delivery or pick up at a later date.

Upon completion of secure payment, at 906 a receipt data set may be provided to and/or generated by the customer mobile device 102, which the customer and/or customer device 102 may present to the merchant staff for checkout and pick up of merchandise, e.g., in the form of human-readable media bar or QR codes 520, 522, machine-interpretable data, etc. The receipt can be generated directly on the mobile device, but alternatively can be generated at the merchant server and then transmitted to the mobile device over the short range network. With the purchased order filled and collected, the customer then may exit the store.

In another example, two users 10 of mobile or other devices 102, 202 may exchange secure payment instruments or other secure tokens with each other using an NFC link. For example, as described herein, a customer mobile device 102, 202 connected securely comprising a local secure element 116, or having communications access to a remotely stored secure element 116 may obtain a secure cryptogram, or other secure data set, representing a pre-authorized payment token issued electronically by, or on behalf of, an issuing bank or other financial institution. Alternatively, a secure data set or token provided to a customer mobile device 102 may represent a value added service, such as a discount or coupon, which is applicable to a future purchase or transaction. These may be referred to collectively herein as "tokens".

In general, such tokens may be fully negotiable so that a token obtained by one people may be transferred to and thereafter used by another party in receipt of the token from the first person. To exchange tokens, two people each having NFC-enabled mobile devices may tap their respective devices together. As described herein, a token resident on one such mobile device may thereby be transferred to the other mobile device within the NFC link. Alternatively, tokens may be exchanged using barcodes or QR codes as described herein. For example, the mobile device of the transferor may convert the token into a 2D graphic rendered on a mobile device display, which is then read by an input device (such as a camera or other scanning device) and converted back into a secure token by application software.

Tokens may be exchanged P2P in this manner for any purpose generally. For example, the transferor may be providing payment to the transferee in exchange for a physical item, service or other value provided by the transferee. In such cases, payment protocols such as EMV and others may be utilized.

Among the many advantages offered by use of tokens in accordance with this aspect of the invention are reduction of latency at the point of sale, payment capability in the absence of connectivity to a remotely-stored secure element 116 and/or adjudicating sever 110, and the possibility of storing tokens on a mobile device for later use, e.g., prepayment for use by other users, in less fluid circumstances, etc. Such benefits include:

Reduction of latency at the point of sale

Ability to pay at POS without network or communications connectivity

Secure, indefinite storage of pre-paid value on a mobile device

Aggregation, by users 10, adjudicators 110, merchants 112, and others, of payment and other data records, for pattern and other analysis Simplification and improved assurance in payment processes FIG. 7 illustrates aspects of implementation of one or more secure elements and devices 116, including for example the storage therein of credentials or other identifiers useful in transaction authorization and adjudication processes, in secure memory(ies) 106 of mobile or other communication devices 102, 202, 204, 402, etc. In the embodiment shown, one or more secure element(s) 116 are provided on SIM cards and/or other, optionally removable, memories 106 that can, for example, be associated with individual account holders or users 10, accounts held by FIs or other entities 110, 114, etc., and/or specific mobile or non-mobile communication devices 102, 120.

For example, as shown in FIG. 7, such SEs 116 may be provided in the form of encrypted or otherwise coded, machine readable data sets, which may be relatively quite small, representing instructions, content, including credentials and/or other identifiers, and/or pointers suitable for use by applications 104 (including applications 104A and/or B), etc., in securely generating transaction data sets suitable for use in initiating, negotiating, and/or consummating financial transactions at, for example, merchant POS devices 114, 112.

For example, at 1-3 in the embodiment(s) shown in FIG. 7, an applet 105 referred to as "Olive Branch" or "OB" is downloaded to a requestor communication device 102, such as a PDA or other mobile communications device 202, and stored in a SIM card or other secure memory 106 permanently or removably provided therein. The applet 105 may be specific to any or all of an individual user 10 (or an enterprise associated with such user), an individual FI 110, and a specific device 102. While in FIG. 7 the Olive Branch applet 105 is shown as SIM based and loaded as a root application, those skilled in the relevant arts will understand immediately that the OB applet 105 could also reside on any hardware SE 116 (e.g., an embedded memory, an adhesively-attached memory, or sticker, etc.) and can be provisioned to, to example, a section of such SE assigned to or otherwise associated with an individual FI 110 which, for example, has "rented" or "owns" the section.

As shown at 2, such applet 105 may be provided to and stored by the mobile device 202 by, for example, push and/or pull downloading processes from a trusted service manager (TSM) 120 such as a bank or other FI 110 associated with the SIM owner, or accounts accessible thereby, or another authorized entity 112, 114, 122, 420, etc., using a mobile payment or other account-management application 104; and may comprise data security devices such as a public key, a private key, and/or other cryptographical elements; one or more networked resource identifiers ('redirector(s)') such as URL(s) and/or other network address information; memory cache(s) 118 of desired number and size for storing additional data, including for example credentials and/or other identifiers associated with one or more individual users 10 (including businesses and other enterprises); financial or other accounts, or application data associated with such user(s) 10, and/or specific devices 102, 202, etc.; as well as tokens and other transaction- and/or application-related data generated by any or all of the mobile device, a merchant POS system associated with a transaction, and/or one or more FIs.

Figure 8:
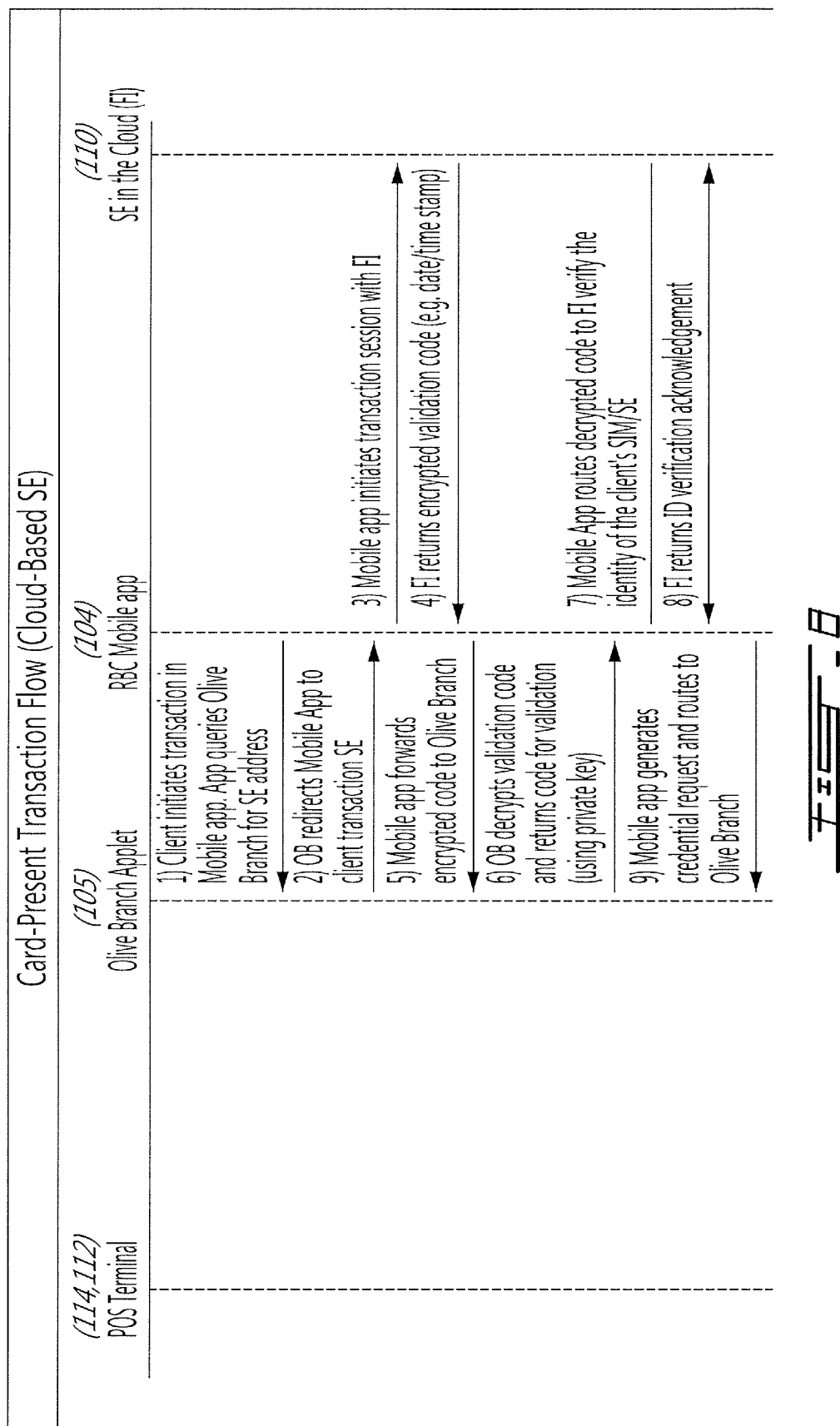

An example of use of a SIM- or other mobile-based applet SE 105 such as that provided according to the process(es) described in connection with FIG. 7 in initiating and conducting a purchase transaction at a merchant POS 114 is shown in FIG. 8. In the example shown, a mobile payment application 104 ("RBC Mobile app") is invoked by an authorized user 10 of the mobile device 102, 202, and at transaction process step 1 queries the SIM-based SE applet 105 (the "Olive Branch Applet") for a network resource identifier ("redirector") associated with one or more accounts owned by or otherwise accessible by the mobile device's user 10.

For example, using one or more suitably-configured input devices 103 of a mobile communication device 102, 202, a user 10 of the device 102, 202 can invoke a general banking application 104, e.g., a virtual wallet, and through interactions with one or more suitably-configured graphical user interfaces (GUIs) generated by the application 104, for example, select which of a plurality of financial institutions, or specific accounts held by a desired financial institution, the user 10 wishes to draw upon for completing the transaction. For example, a user 10 owning or otherwise associated with bank or credit accounts at a plurality of banks and/or credit card companies, and knowing which particular account(s) the user wishes to use in completing the transaction, can select the corresponding bank or credit card company. The user can make such designation by, for example, invoking the application 104 and, on his/her own initiative or in response to an application generated prompt, enter data representing a pre-determined and optionally user-selected identifier, such as a telephone number, e-mail address, nick-name, PIN, etc., and thereby designate quickly and easily which of the many financial institutions, and/or specific payment accounts, the user 10 wishes to use in the transaction. The banking application 104 can use such user designation to generate a query for the applet 105, requesting a resource locator associate with the desired FI and/or account.

As previously noted, device 102, 202 need not be a mobile device, but can be any device suitable for use by a user 10 in entering purchase and other data transaction requests, including for example a networked desktop or laptop computer, etc. As will be understood immediately by those skilled in the relevant arts, data processes described herein are conveniently adaptable to implementation using any such device(s).

Advantages offered by enabling a user 10 of a device 102, 202, etc., to identify desired accounts and/or FIs through the use of such pre-determined identifiers, include the ability of users 10 to maintain confidential information associated with their accounts without disclosing it over public communications networks 250; the ability to avoid the necessity of repetitive entry of relatively long and/or otherwise complex data strings (e.g., bank, credit, and/or other FI or account identifiers); ease of memory for users 10; simplified experience for customers/users 10; improved data security and lower bandwidth communications.

At process step 2 of FIG. 8, the network resource locator requested at step 1 is accessed via or otherwise provided by the applet 105; and at 3 is used by the mobile payments application to initiate a transaction request to an FI associated with the resource identifier.

For example, at 2, the applet 105 can parse the request generated at 1, access a suitable resource locator stored in redirector memory 131 as a part of the process described in connection with FIG. 6, in SE 116, and provide the requested network resource locator to the application 104. As will be understood by those skilled in the relevant arts, in embodiments in which a user-friendly identifier such as a telephone number, e-mail address, nick-name, PIN, etc., is entered by the user, an association of such identifier with a resource locator provided at 2 can be made wholly or partially by either or both of general application 104 and specific applet 105. Likewise, the generation of data representing a transaction or session request at 3 can be generated wholly or partially by either or both of application 104 and applet 105.

As will be understood by those skilled in the relevant arts, once they have been made familiar with this disclosure, a particular advantage offered by these aspects of the invention is that an OB applet 105 may be implemented in a wide variety of forms, including for example hardware, application, applet, and/or suitably-encrypted data sets stored in secure or unsecured memory(ies).

It should be noted that memory object, or section, 131 of FIG. 7 may be used for purposes other than a redirector. It may, for example, comprise data or firmware causing it to emulate any one or more specific forms of types of payment instrument, as for example described herein.

At 3, as noted above, data representing the transaction or session request generated by the application and/or applet is forwarded by the user 10's device 102, 202 to the FI 110 associated with the designation made by the user 10 at 1. For example, a suitably-configured data set can forwarded to a designated uniform resource locator (URL) associated with an FI server 110 over a public or other communication network 250 such as the internet, by use of one or more wireless or other communication systems of the user's device 102, 202, etc. Suitable protocols, components, and other means of facilitating communications between the components 104, 105, 110, and 112,114 will be well within those having ordinary skill in the relevant arts, when they have been made familiar with this disclosure.

In response to the transaction initiation request forwarded by the device 102, 202, at 4 the FI/adjudicating server 110 returns to the mobile device 102, 202 and application 104 an encrypted validation code, which may include any data string suitable for use in confirming the presence on or availability to the device 102, 202 of keys or other encryption tools specific to the requesting user 10 and/or device 102, 202. For example, at 4 the FI/adjudication server 110 can generate and encrypt a validation code representing an encrypted date/time stamp, and forward it to the requesting device 102, 202, via the application 104, which application can, at 5, forward the validation code to the applet 105, to be interpreted using for example cryptographic elements such as a public/private key combination provided by or on behalf of the adjudicating server 110 and stored in memory elements 133, 135 within the Olive Branch applet 105, pursuant to processes such as those described conjunction with FIG. 7. Having decrypted the validation code, at 6 the applet 105 can return the decrypted code to the application 104; and at 7 the application 104 can return the properly-interpreted validation code to the adjudicating FI 110, as proof that the device 102, 202 and/or user 10 are authorized to access the adjudicating server 110 with respect to requests for authorization and processing of purchase and/or other data processing transactions.

For clarity, the inventors again note that an applet 105 and/or application 104 may be implemented in a wide variety of forms, including for example hardware, application, applet, and/or suitably-encrypted data sets stored in secure or unsecured memory(ies).

Having confirmed proper decryption and return of the validation code returned at 7, the adjudicating server 110 can return to the requesting device 102/application 104 an acknowledgement, which acknowledgement can be forwarded to the applet 105.

Having confirmed that a secure communications link/session has been established, and/or has otherwise been enabled, with the adjudicating server 110, at 9 the application 104 can be used, when the user 10 is ready to complete a transaction (such as either to acquire and store a secure data set representing a prepaid or otherwise pre-authorized purchase token, or to initiate a real-time purchase request at a merchant POS 114), by means of a keyboard or other input device 103 to generate a credential request, and to route the credential request to the applet 105.

In response to the credential request routed at 9, the applet 105 can access one or more credentials or other authorization codes stored in memory(ies) 137 of the SE 116/applet 105 pursuant to processes such as those described in connection with FIG. 7. Credentials accessed at step 9 in memory 137 and returned at step 10 can represent any desired or otherwise suitable factors related to a proposed transaction, and can include pluralities of independently generated and associated identifiers. For example, credentials stored in memory element(s) 137 of SE(s) 116 and/or applet(s) 105 can comprise data configured to represent any one or more of:

- One or more identifiers uniquely associated with one or more authorized holder or users of one or more transaction payment account, such as bank and/or credit accounts held or administered by an FI 110. As will be understood by those skilled in the relevant arts, once they have been made familiar with this disclosure, such identifiers may include any data or information associable with such users, including for example any one or more of user names; birthdates; driver's license, social insurance/social security, and/or other government-assigned identifiers; identification names and/or numbers assigned by businesses, associations, and/or other enterprises; network and/or physical addresses; telephone numbers, user-designated names, nicknames, PINs, etc.;
- One or more identifiers uniquely associated with the mobile or other communication device 102, 202 used to generate the credentials request As will be understood by those skilled in the relevant arts, once they have been made familiar with this disclosure, such identifiers may include any data or information associable with such accounts, including for example, including for example manufacturer- and/or regulator-assigned serial numbers, nick-names assigned by users, administrators, or others to the unique device; public and/or private keys provided in advance (e.g., at time of original provisioning, or occasional update) by any of adjudicating server(s) 110, TSMs 120, and stored, for example, in memory(ies) 133, 135, etc.;
- One or more identifiers uniquely associated with the SE 116 and/or applet 105, including for example a SIM or other removable memory 106. As will be understood by those skilled in the relevant arts, once they have been made familiar with this disclosure, such identifiers may include any data or information associable with such memories or SEs, including for example one or more applet identifiers (AIDs) associated with data and/or instruction sets associated with payment protocols configured for use in transactions with specific payment service providers, such as VISA, MasterCard, EuroPay, etc.; serial numbers or other identifiers provided by the SE manufacturer, other OEM, telco or other communications service provider, and/or TSMs 120; public and/or private keys provided in advance (e.g., at time of original provisioning, or occasional update) by any of adjudicating server(s) 110, TSMs 120, and stored, for example, in memory(ies) 133, 135, etc.; and
- One or more identifiers uniquely associated with the at least one transaction payment account to be used in completing a transaction. As will be understood by those skilled in the relevant arts, once they have been made familiar with this disclosure, such identifiers may include any data or information associable with such accounts, including for example account numbers, user- and/or FI-associated nicknames, etc.

Having accessed credentials requested or otherwise designated at 9, at 10 the applet 105 and/or device 102/application 104 can cause the credentials to be retrieved from any or all of memory(ies) 106, 105, 133, 135, 137, etc., encrypted using public and/or private keys, etc., accessed in memory(ies) 133, 135, etc; and associated with one or more network resource addresses associated with the same and/or other adjudicating server(s) 110 using for example network address information retrieved from a memory 121, application 104, applet 105, and/or other suitable source(s).

At 11, the mobile application 104 can cause the encrypted credential information, along with any other required or otherwise desirable information, to be routed to one or more FIs and/or other adjudicating server(s) 110, using for a network address so retrieved and one or more wireless or other communication systems of the device 102, 202, etc.

For example, in embodiments of the invention such as those adapted for processing of requests for downloading of pre-paid or otherwise pre-authorized purchase tokens, or payment or other financial transactions, data routed at 11 can include further information, such as requested pre-authorized and/or real-time purchase request amounts. For example, a user 10 seeking a pre-paid token or completion of another purchase transaction can, using input device(s) 103, interact with application 104 to generate data representing one token and/or purchase amounts, and to cause data representing such amount(s) to be associated with the credential information accessed at 9, 10, and used to generate a secure credentials authorization and/or transaction data set, and to cause such credentials and/or transaction authorization data set to be routed from the purchaser device 102 to the adjudication device 110.

Data routed at 11, like data routed at 3 and 7, can also include network resource locators, such as telephone numbers, URLs and/or other network addresses, etc., useable by the adjudicating server(s) 110 for routing information back to the requesting device 102, 202, etc. over network(s) 250, etc.

At 12, one or more processors of the server 110 associated with the financial account holder server can receive the transaction request data set generated by such networked purchaser communication device 102, and can adjudicate the implied authorization request by:

- decrypting and otherwise interpreting the request data set into the corresponding identifier(s) associated with the at least one transaction payment account administered by the financial account holder or user; the at least one identifier associated with an authorized user 10 of the transaction payment account; the at least one identifier associated with the purchaser communication device 102; the data representing a pre-paid token or other transaction amount; and the data representing a transaction authorization routing address;
- accessing a transaction authorization data set associated with the transaction payment account represented by the received transaction payment account identifier, such as a secure data base of account or other payment information held and/or otherwise administered by the FI and/or other adjudicating server 110, including for example in memory(ies) 218(B) (FIG. 2); and
- determining that:
  - the received identifier associated with an authorized user of the transaction payment account corresponds to at least one authorized user associated with the transaction authorization data set, e.g., by comparing the received identifier with a corresponding identifier previously stored in the data base(s) 218(B); and
  - the received identifier associated with a purchaser communication device corresponds to at least one purchaser communication device associated with the transaction authorization data set, e.g., by comparing the received identifier with a corresponding identifier previously stored in the data base(s) 218(B);

determining that an amount of funds associated with the identified transaction payment account is sufficient to cover the transaction amount, for example by comparing an amount associated with a request for purchase of a preauthorized payment token, or for application to a real-time on-line or POS purchase request to an amount of funds available in a savings, checking, credit, or other payment account; and conditioned on said determinations, generating a transaction authorization data set; and routing the transaction authorization data set to the transaction authorization routing address, e.g., by returning a transaction authorization data set to the requesting user device 102. Such transaction authorization data set can comprise any one or more data items suitable for serving as an authorization for a completed transaction. In the case of the purchase of a pre-authorized payment token by a user 10, such authorization can comprise delivery of an encrypted token data set, as described herein. In the case of a real-time purchase transaction, at a POS 112 or online, such authorization can comprise an encrypted or plain-text code accepted by the merchant 112, 114 as an indication that funds are available and the transaction is authorized.

At 13, the authorization data set routed at 12 can be received by the requesting device 102 and application 104, and routed to the applet 105 for storage in a SE 116, for example in a secure memory 137 as shown in FIG. 8.

An example of negotiation of a purchase transaction at a merchant POS 112 or e-commerce website is described through reference 14-17 of FIG. 8.

At 14, a user 10 of a device 102, 202, etc., establishes a purchase transaction session with a merchant POS device 112, e-commerce website accessed via a network 250, etc., by accessing a mobile payment application 104 as described above. For example, as described above a user 10 of a device 102, 202 can enter a merchant premises and begin a purchase negotiation session with a merchant POS device using an application 104 and a Bluetooth or other NFC communication system of the device 102, 202. Suitable means for establishing such sessions will be well understood by those skilled in the relevant arts, in view of the disclosure. Some such methods are already known, and doubtless others will be developed hereafter.

In a typical purchase negotiation session, a user 10 will present one or more items for purchase, and the merchant POS device 114 will be used, by means of scanners, manual keypad entry, etc., to generate a list of items to be purchased, with prices and other desired information. When all desired items have been added to such generated list, the user device 102 and merchant device 112 (including an m-commerce web interface) can be used to generate a transaction completion request, typically comprising a purchase total, including applicable tax(s), etc.

Such completion request can be presented to the user 10's mobile banking application 104 and, if/when the user 10 is satisfied with the terms of the transaction, the user can authorize payment.

At 15, upon indication by the user with willingness to proceed, as for example by use of a keyboard, touchscreen, or other input device 103 to generate a confirmation signal, the user's application 104 can cause the user's device 102 to either negotiate a transaction authorization using a process 1-13 described above, and/or access a previously-negotiated purchase authorization (e.g., a secure preauthorized payment token) in the SE 116/applet 105, for example in memory(ies) 137, and forward a corresponding transaction authorization data set to the merchant POS or e-commerce device 114, using an NFC or other communication system of the device 102.

At 16, the merchant device 112 can perform any desired further authorization/authentication processes (including optionally an independent check with the same or other adjudication server(s) 110, via for example a network 250), and can confirm closing of the purchase transaction by generation and delivery to the requesting device 102 of a receipt or other confirmation or acknowledgment data set.

A secure data set representing payment for the transaction can be provided directly by the requesting device 102, for example in the case of use of pre-authorized payment tokens, and/or indirectly, by one or more server(s) 110, 240, 280, etc., in the case of real-time purchase transactions.

In the case of use of pre-authorized payment token(s), at 17 the user's mobile payment application can cause a pre-paid token stored in the SE 116/applet 105 to be decremented by an appropriate purchase amount, and to be stored with updated pre-authorized payment amount information, for future use as desired.

As will be understood by those skilled in the relevant arts, process(s) 1-17 of FIG. 8 and 1-3 of FIG. 7 can be used to replenish pre-authorized tokens as desired, in addition to or in lieu of purchase of new tokens.

In various embodiments, aspects of the invention, including for example the use of encrypted pre-payment and/or other pre-authorization tokens, may be applied with particular advantage to m- and other e-commerce transactions. As is known to those skilled in the relevant arts, m- and other e-commerce transactions increase the difficulty of properly confirming purchaser identity(ies), and therefore, among other problems, the likelihood of fraud. Thus, for example, in some cases fewer payment instruments may be made available to users, as banks and other FIs seek to avoid risk and rely on credit and other types of payment transactions. Alternatively, the implementation of additional steps in online transaction processes, in order to reduce the possibilities of fraud, can irritate consumers and result in increased incidences of the abandonment of legitimate transactions prior to completion.

In such and other circumstances, the use of securely-encrypted, previously authorized credentials, which may include previously-authorized payment amounts, can allow a user of a desktop, laptop, tablet, handheld, or other 102, 202, 204, 206, etc., to interact securely and conveniently with merchants online, e.g. via one or more networks which need not be located at a store or other common geographic POS, whether or not such tokens are stored on SIM cards or other SEs or secure memories 106, 116, 118, etc.

FIGS. 9 and 10 are schematic diagram showing data communications exchanges suitable for use in initiating and conducting purchase and/or other e-commerce transactions (including m-commerce transactions) in accordance with such aspects of the disclosure. In such examples a user 10 can own or otherwise control one or more transaction request devices 102, 202, etc., upon which have been stored, through previous interactions with one or more FIs at which the user 10 owns or otherwise controls one or more payment accounts, as described herein, securely-encrypted authorization and/or payment tokens. Being encrypted using, for example, PKI and/or other encryption techniques, such tokens may be stored in secure or relatively unsecure memory, such as memory on a device hard drive that may be accessed simply by controlling and turning the device 102, 202, etc., on.

In the embodiment shown in FIG. 9, an m-commerce transaction is initiated by, for example, a user 10 of a tablet or other mobile device 102, 202 navigating, for example through the use of URLs and/or other network addresses and/or protocols, to a merchant system 112, 114, such as a networked server or website. By, for example, accessing menus and other interactive GUIs provided by the merchant, the user 10 can designate one or more items or services the user wishes to purchase, such as a hotel room, book, CD, article of clothing, etc., and generate, or cause to be generated, a corresponding transaction request data set.

Having generated a transaction request data set comprising identifiers associated with all desired purchase items/services, and optionally corresponding purchase, tax, delivery, and/or other payment amounts, at (1) in FIG. 9 the user 10 can initiate a payment process by for example selecting a corresponding GUI device such as a "pay now" link and invoking a merchant payment application. As one option, the merchant payment application can include a selection such as "Checkout with my bank", selection of which by the user 10 can invoke a application(s) 104, 105 on the mobile device 102, 202, which application 104, 105(s) can reside wholly on the mobile device 102, 202 or partly on one or more FI or third party servers 110, 112, 120, etc.

Invocation of application(s) 104, 105 by a user 10 can cause a display or other output device 103 of the mobile device 102, 202 to display a user verification screen such as a GUI adapted to accept from the user input of a personalized identifier, such as a phone number, e-mail address, PIN, etc., which allows the device 102, 202 to access an encrypted payment/authorization data set stored in secure or other memory 106, 116, 118, etc. Such token may comprise data representing a plurality of identifiers, as described herein, including for example identifiers uniquely associated with the user 10, the device 102, 202 to generate the transaction request, and one or more payment instruments or accounts controlled by an FI 110 on behalf of the user 10. Optionally, such token may, as disclosed herein, comprise data representing an amount previously sequestered or otherwise segregated from the user 10's proposed payment account, to ensure payment at a time of the user 10's choosing, and thereby represent a pre-paid or other card-present token.

Upon invocation at (1) of the desired, FI-specific (e.g. "Checkout with my bank") payment option by the user 10, the user's device 102, 202, etc., can call a corresponding secure FI application 110 by routing to the FI application or server 110 an authentication request comprising a suitably-configured request data set. The FI server or application 110 can respond with suitably-configured signals to enable to the user application 104, 105 to establish with the FI server or application 110 a secure communication session using, for example, suitable encryption and/or other secure channel devices. For example, the user transaction application 104, 105 can, among other data, route to the FI server or application 110 an encrypted identification authorization token comprising a plurality of encrypted identifiers as described herein, and upon successful interpretation of such credentials the FI server 110 and user application 104, 105 can proceed to establish a suitably-secure transaction communication session.

In such embodiments of the invention which are directed toward m- and other e-commerce transactions, among products of a secure transaction communication data session can be authorized access by the FI 110 or and/merchant or third party server 120, etc., to information required for physical and/or virtual delivery of any ordered goods or services, and/or confirmations thereof, etc.

Having established a suitably-secure communication session at (1) with the respective FI 110, and for example having further confirmed the contents and terms of a desired order, at (2) in FIG. 9 the user 10 can select a command icon, or item, on a suitably-configured payment GUI of the application 104, 105 to confirm placement of the order. For example, a hypertext link to a suitably-configured order completion instruction may be provided, using text identifier(s) such as "place order", "complete transaction," etc. Optionally, the user 10 may be provided, through the use of suitably-adapted GUI(s), to confirm the contents and terms of the order prior to selecting the order completion item or otherwise causing execution of the transaction completion command. Upon invocation of such a 'complete transaction' command at (2), the user's application 104, 105 can access, in secure or other memory 106, 116, 118, etc. of the user's device 102, 202, etc., and route to the FI server or application 110 a secure authorization and/or payment token comprising at least three independent identifiers, as described herein.

Having properly interpreted the transaction authorization data set routed by the user device 102, 202 at (2), at authorized the requested transaction, at (3) the FI server or application 110 can generate an approved-transaction data set, comprising suitable identifiers, including for example data representing authorized payment account(s) and amount(s) and forward them, in any desired format(s), to any one or more desired merchant(s), payment processor(s), protocol or format translator(s), issuer(s) and/or other third party server(s) or application(s) 112, 184, 110, 120 for use in completing funds or other payment transfers, etc.

Having received any suitable or otherwise-desired confirmation(s) from transaction processor(s) 112, 184, 110, 120, etc., at (4) the FI server or application 110 can generate and route to the requesting user device 102, 202, etc., any desired notifications confirming successful payment. As will be understood by those skilled in the relevant arts, routing of such notification(s) at (4) can be conditioned upon settlement of any transaction costs, by, for example, deduction of funds from the designated payment account(s).

In the embodiment shown in FIG. 10, an e-commerce transaction is initiated by, for example, a user 10 of a tablet or other mobile device 102, 202 navigating, for example through the use of URLs and/or other network addresses and/or protocols, to a merchant system 112, 114, such as a networked server or website. By, for example, accessing one or more suitably-configured interactive menus and other interactive GUIs 1002 provided by the merchant system 112, the user 10 can designate one or more items or services the user wishes to purchase, such as a hotel room, book, CD, article of clothing, etc., and generate, or cause to be generated, a corresponding transaction request data set.

Having generated a transaction request data set comprising identifiers associated with all desired purchase items/services, and optionally corresponding purchase, tax, delivery, and/or other payment amounts, at (1a) in FIG. 10 the user 10 can initiate a payment process by for example selecting a corresponding GUI device such as a "checkout" item that causes the merchant payment application to generate a GUI comprising a confirmatory list of item(s) and/or service(s) designated for purchase by the user 10.

Having reviewed the list and confirmed that it is correct, at (1b) the user 10 can select a further GUI item "Confirm Order", "Pay Now," etc., and thereby cause the merchant application at (1c) to initiate a payment process by, for example, generating a GUI comprising a list or other presentation of one or more payment options, and causing such list to be presented by a display 103, etc., of the user's transaction device 102, 202, etc.

A payment options list generated at 1(*b*) can include a selection such as "PAY with My Bank" 1004, selection of which by the user 10 can invoke application(s) 104, 105 on the mobile device 102, 202, which application(s) 104, 105(*s*) can be resident on either wholly on the mobile device 102, 202 or partly on one or more FI or third party server(s) 110, 112, 120, etc.

Selection of a "PAY with My Bank" option or item 1004 by a user 10 at (1*c*) can cause the user's device 102, 202 and/or application 104, 105 to be redirected at (2*a*) to a secure FI server and/or application 110, and to request an authorization session or transaction. In various embodiments, initiation of such authorization session or transaction can be conditioned upon entry, by a user 10 of the device 102, 202, and/or application 104, 105 of one or more identifiers which may optionally be specific to access of the application 104, 105 and/or authorization request. For example, as shown at 1004 and otherwise disclosed herein, generation of such a request can be conditioned upon entry of any one or more identifier(s) designated by or otherwise known to the user 10, such as a telephone number, nickname, password, etc.

Successful invocation of a "PAY with My Bank" option or item 1004 by a user 10 at (2*b*) can result in routing of a secure identification token, which may be stored in any secure or other memory(ies) 106, 116, 118, etc. of the device 102, 202, to the FI server or application 110. Successful interpretation of such token, which may be encrypted as described herein, and which may include any three or more unique user, device, and account identifiers as described herein, may be applied by the FI server or application 110 as a condition of any authorization by the FI server or application 110 of the request for authorization of a transaction.

Conditioned upon such authorization, at (2*c*) the FI server or application 110 can return directly to the e-merchant 112, 114, 1002 and/or to a third party payment processor 120, 420 a payment token comprising, for example, encrypted identifiers representing any or all of an eShopper identifier uniquely identified with the purchasing user 10; an FI-specific secure cloud identifier associated with the authorizing FI application or server 110; a specific transaction identifier generated by the merchant 112 and/or user application 104, 105, a transaction amount (e.g., the total of the cost of the goods/services to be purchased, plus any applicable taxes, delivery charges, etc.); and one or more identifiers associated with the payment method (e.g., account) designated by the purchasing user 10.

If routed to a third party payment processor 120, 420, such token may be held pending completion of a transaction authorized by the user 10 of the device 102, 202.

At (3*a*), either independent of the process(es) of (2*c*) or conditioned thereupon, the user 10's device 102, 202 can be caused to display one or more GUI(s) adapted for use by the user 10 to confirm the contents and terms of the order prior, and to signify such confirmation by selection of an order completion item or other execution of a transaction completion command. Selection of such a command can cause the user's device 102, 202 and/or application 104, 105 to generate a suitably-configured confirmation data set, and to route the confirmation data set to the corresponding merchant 112 and or payment processor 120, 420, etc.

Conditioned upon receipt of a confirmation signal generated by the user at (3*a*), at (3*b*) the merchant 112 or third party payment processor 120, 420 can route the authorized payment token data set to the FI 110 holding or otherwise controlling the corresponding payment account.

At (3*c*), conditioned upon successful deciphering of the payment token routed at (3*b*), and upon any further confirmation that any unique user, device and/or account identifiers included therein correspond to an authorized payment account, the FI server or application 110 can generate a corresponding transaction token data set comprising for example suitably-encrypted payment details, and route such transaction token data set to any desired third party payment processor(s) 120, 420, etc., including for example any processor(s) 184 stipulated or otherwise agreed as part of a payment processing network or scheme, such as those set out by the EMV network, etc. At (3*d*), such scheme or processing network(s) 184 can forward any further-desired authorization data sets in the form of, for example, "vChip" authorizations, to a TSYS network or processor, etc.

Conditioned upon any authorizations required at (3*c*) and/or (3*d*), at (3*e*) any desired transaction 'approval' or 'decline' signals may be generated, and routed back from the generating payment processor 120, 420, 112, etc., to the 'scheme' processor(s) 184, third-party payment processor 120, 420, and/or merchant 112, and user device 102, 202 etc.

At (5) and (6) in FIG. 10, final approval may be communicated to the user 10 via his or her device(s) 102, 202, etc., and any purchased goods or services may be physically or virtually routed to the user, as appropriate.

Among advantages offered by e-commerce systems and processes such as those shown in FIGS. 9 and 10 are that users 10 can be enabled to complete purchase portions of such processes by means of a single confirmatory click on a suitably-adapted interactive command device, such as a "pay now with my bank account" link, and to cause items or services thus purchased to be delivered to shipping addresses associated with the purchase account and held in custody of the applicable FI 110; purchase credentials, including for example any required names, account numbers, billing and/or shipping addresses may be held by a single FI 110, rather than a plurality of merchant systems 112 or third party systems 120, 420, etc.; and storage of user loyalty credentials, such as for example travel profiles, passport information, frequent flier numbers, and seat, food, or other preferences may be similarly stored by a designated purchase-account FI 110.

Among the many advantageous applications of 'virtual olive branch' applications such as those described in connection with FIGS. 9 and 10, for example, is their use in 'card present' transactions that can be completed when active communications links, such as wireless telephone networks, between a user device 102, 202 and an FI 110 holding a desired payment account are not available.

Referring for example to FIG. 10, if at the time a user 10 desires to complete a transaction with a merchant 112, 1002 no communications connection between the user device 202 and the FI system or application 110 is not available, then a previously-authorized payment token or other tokenized authorization request, such as any of those described herein, stored in encrypted form in secure or other memory 106, 116, 118, may be routed from the user device 102, 202 to either or both of the merchant system 112 and a suitable third party payment processor 120, 420 for processing using wired or other independent transaction communication network(s) 250. For example, using such independent network(s), such tokens or other authorization requests can be routed by any of systems 112, 120, 420, etc., to any systems 110, etc., for payment authorization without need for direct communication between a requesting device 102, 202 etc and the designated payment FI system 110.

Another of the particular advantages offered by systems, devices, and processes in accordance with the invention is that they can enable or enhance the security of transactions such as purchases conducted from virtually any location(s), using any type(s) of networked communications between any type(s) of purchaser, merchant, FI, and/or third party devices 102, 202, 112, 114, 110, 120, 420, etc.

As one example, the invention enables the creation of cryptograms suitable for use in secure completion of processes such as purchase transactions when portion(s) of communications network(s) or channels (for example, a wireless telephone connection) are not available. For example, if a user 10 of a device 102, 202 shown in FIG. 5A wishes to conduct a purchase transaction at a merchant POS 114, using a credit or debit account held on the user 10's behalf by an FI 110 operating or otherwise associated with a cloud-based SE 116, as shown in FIG. 5A, during a time when NFC communications are available between the user device 102, 202 but not between the device 102, 202 and the FI 110, 116, the invention can enable such a transaction to be conducted on a 'card present' basis, with a high degree of confidence in the security and bona fides of the transaction.

In anticipation of the possibility of such a case, for example, an FI 110, 116 can cause the generation and secure storage of data to be used for 'card-present' transactions when "unpredictable" data typically provided at the time and/or location of the transaction are not available, or cannot be verified by communications by the FI 110, 116 with both the merchant system 112, 114 and the user device 102, 202. Such pre-authorization criteria may be generated in advance of a proposed transaction, and provisioned to a user 10's mobile device 102 (e.g. smartphone or tablet computer) or static device 202 (e.g. desktop or laptop computer), and/or held in a secure element 116 or other memory of a server 110 associated with the FI. Such pre-authorization data, and cryptograms generated using such data, may be of any desired format(s) or protocol(s), and may comprise any suitable or otherwise desired authentication and/or transaction data, including for example real or 'simulated' pseudo-unpredictable transaction data.

For example, in a system 100 adapted for completion of purchase transactions using cryptograms and/or payment tokens generated according to the EMV protocol, one or more pseudo-unpredictable identifiers may be generated by the FI 110, 116 and/or user device 102, 202 in advance of a proposed transaction, and stored in secure or other memory associated with the FI 110, 116, and pushed to the user's device 102, 202 for secure storage, using an SE 116, public/private key encryption, etc. Such pseudo-unpredictable identifiers may be of any suitable form, preferably comprising any data not easily replicated or deduced by a potential fraudulent purchaser.

At the time of a desired transaction, a user's device 102, 202 and/or payment application 104, 105 can generate a suitably-formatted transaction cryptogram by, for example, receiving from the merchant POS 112, 114 transaction information such as a purchase amount and merchant identifier, and adding a plurality of secure identifiers, such as identifiers associated with the specific user 10, the user's specific device 102, 202, and a payment account associated with the user 10, as described herein; a pre-authorized or other purchase amount associated with the proposed transaction, and data meant to substitute for 'unpredictable' data often associated with EMV cryptograms. For example, where EMV-compliant cryptograms commonly comprise geographic vendor locations, vendor POS device serial numbers, pre-authorization, such substitute "unpredictable" data can comprise a user 10's telephone number, PIN, nickname, or any other data known only to the FI 11 and/or user 10. The device 102, 202 and/or application 104, 105 can generate a protocol-compliant cryptogram, and route the cryptogram to the FI 110 and/or any third party adjudicators such as TSYS 120, 420, etc. For example, if a direct communications link is not currently available between the FI 110 and the device 102, 202, such cryptogram may be routed to the FI 110 by passing it from the device 102, 202 to the merchant POS 112, 114, which can forward it through a secure pipeline to the FI 110 and/or any desired third-party adjudicator(s) 120, 420.

Having received the cryptogram comprising the pseudo-unpredictable data via any available communications channel, the FI 110 and/or other adjudicator can then decrypt the cryptogram, compare the decrypted identifiers and purchase data to identifiers and pre-authorized purchase limits, etc., previously stored in memory associated with the FI 110 or other adjudicator, and determine whether to authorize the transaction.

Using such "triangulation" type techniques, which can be considered similar to check-sum processes, for example, "unpredictable data" normally provided in an EMV- or other protocol-compliant cryptogram can be substituted by information known only to the FI and/or user 10, and a purchase or other secure transaction can be completed with a high degree of security and confidence.

As will be understood by those skilled in the relevant arts, such techniques can be used to complete secure transactions in both POS and m-commerce or other e-commerce transactions, using any desired mobile or static devices 102, 202, etc., and any types of wired or wireless networks 250.

A further means of minimizing opportunities for fraud may be to associate with a cryptogram prepared as described above with a time of its creation, as for example by adding to or otherwise associating with the cryptogram a suitable data record, and requiring, as a condition of transaction approval, that the cryptogram be successfully deciphered, compared to such previously-stored data, and approved within a given time limit, which may be typically on the order of a fraction of a second to several seconds. As will be understood by those skilled in the relevant arts, such time limits can be used to prevent use of unauthorized decryption algorithms by those attempting to perpetrate fraud, because, for example successful decryption using such techniques typically requires relatively significant amounts of time.

Further examples of the implementation of SIM- and cloud-based SE interactions in enabling transactions include the following use cases. The use cases described provide examples of setting up mobile-device based SEs 116; initiating or invoking SIM-based SE applications 105; and generating payment tokens for use in transactions. In addition to these processes, SIM-based SE applications 105 in accordance with the disclosure will support top-level Certificate Management functions, which can for example enable institutions to access and/or otherwise interact with SIM-based SEs 116, 105 in accordance with the invention for purposes of processing secure payment transactions.

Installation Case: installation of an SE application 105 on a mobile 202 (or other) device 102: A Root TSM 120 can prepare the mobile device's SE 116 by creating a sub-security domain 105, 118, etc., in the SIM 106, or in other secure, optionally-removable memory, for a requesting financial institution. The TSM 102 can provide, or otherwise make available to the mobile device 102, 202, a mobile SE application package 105, which may for example include one or more Visa or other mobile payments compliant applications (VMPAs) 220A-220D (FIG. 2) and which may comprise a plurality of applets 105. The TSM 120 can authorize or otherwise enable execution of installation commands configured to cause registration of an applet identifier (AID) corresponding to each applet within the SIM-based SE package. Such applets may, for example comprise shells for a wide variety of payment types or protocols, including for example Master Card, Visa, Debit, Controller; and may manage caching of tokens that come into the SE. Such TSM commands may further install, or otherwise place, the SIM-based SE into a prepersonalization state, and swaps a public key such as a Telco key with one or more private keys, such as keys specific to particular banks or other financial institutions. The installation command execution may further cause a sub-security domain key to be returned to the TSM host, and/or to any other suitable party(ies).

Use Case 1: Using a sub-security domain key such as that provided in the Installation Case, a secure channel may be opened between an FI or other host 110 and the SIM-based secure element app 105, using for example processes 1-3 of FIG. 7 and 1-13 of FIG. 8. A "personalization" command may be sent to the SIM-based app 105, and may result in return of a response comprising a public key associated with the SIM-based app, for storage in a memory subdomain 133 and setting of the SIM-based app in a "personalized" state unique to, for example, either the mobile device associated with the SIM-based app or a user associated with the mobile device, such as an account holder or administrator.

Use Case 2:

Pre-transaction ("pre-tap"): at a convenient time when a 3G or suitable communications network is available, a "wallet" payment app 104 (e.g., "RBC Mobile app" in FIG. 11B) "spoofs" (acts in the manner of) a POS terminal 112, and queries a TSM 120 or other communications server 110, etc., for identification and other required transaction data (select aid etc) required for generation of a payment token. The SIM-based SE app 105 then sends copies of such data to a tokenization engine associated with an FI 110 that is to be identified with an account to be used at payment, and to a Controller applet 105 on the SE 116, in order to create a "substitute" tokenized transaction cryptogram, which can be stored by either or both of the SIM-based SE or the FI tokenization engine.

The SE app is now ready to process a transaction.

At the time of transaction ("at tap"): A POS terminal 112, 114 selected to process a desired transaction requests payment account (e.g., card) information, which is provided by the SIM-based SE app 105 through a mobile payments app 104.

At consummation of the transaction ("post tap"): A transaction authorization request is sent from the merchant POS system to a payment processor 280 associated with the transaction (e.g., TSYS). Such authorization request can comprise a tokenized cryptogram, and/or real on-line payment ("pdol") data. The payment processor (TSYS) 280 can identify the authorization request as being associated with a payment token (transaction specifics to be determined later). The authorization request can be directed to the same or other tokenization engine associated with an FI 110 associated with a payment account identified for the transaction; the tokenization engine can look up the request, substitute in the pretend pdol data, and return the transaction request with the substitute pdol data, to the payment processor, for continued processing.

In parallel to the authorization, the mobile payment app can send the real pdol data to the tokenization engine, which can compare such pdol data with data received from the payment processor. The resultant match can reduce EMV risk. In some circumstances, latency in the mobile device sending the real pdol data to the tokenization engine may prevent the real pdol match from happening.

Further advantages and mechanisms involved in implementation of SIM-based or other Olive Branch transaction applets 105, and corresponding transactions, include:

Minimization of exposure of banking credentials to third parties, including for example network providers and those having or acquiring access through such providers, while achieving functional goals such as:

Identification of customer owned-secure element or SIM cards with a "hardware level" certainty as a second factor identification model.

allowing cloud-based credentials to "pass through" to point of sale terminals via SIM card channels, which may be more available or reliable than less-reliable or available channels such as Host Card Emulation.

Association of specific identities with SIM(s) 106 and/or or secure element(s) 116. For example, an Olive Branch applet 105 can leverage existing asymmetric key algorithms, such as RSA or others. Within many SIM and/or other secure element architectures is possible for an applet 105 to independently create, or store, a unique public/private key pair. Olive Branch can also securely store its private key within the SIM or secure element, for example, in a secure memory element 135, such that it can never be exposed outside of the secure element 116. This function allows for anybody who has access to the public key match to understand with a high level of certainty the identity of the SIM or secure element that Olive Branch runs on by, for example running authentication or adjudication processes such as that described in connection with steps 1-7 of FIG. 8. The public key can be stored both in a secure memory 133 of the user's device 102, and in a remote table database 218A, 218B that the FI or other adjudication system 110 has access to, and will have the ability for each FI 280 to tie various data that each protects within this remote list of public keys. The public key table 218A, 218B can be managed by an independent adjudicator, or adjudicator group, delegated by the conglomeration and representatives within each respective FI 110.

Among further advantages offered by applets 105 in accordance with the invention is the ability to allow for relay of cloud-based credentials, one at a time, through a user's device 102, and to provide hardware-based caches 118, 137 to control individual transaction data sets. An applet 105 in accordance with the invention has the ability of generating transaction data sets suitable for presentation in conjunction with various AID (Application Identifiers) to POS terminal(s) 112 when triggered by a POS 112 or mobile application 104. This can enable transaction data sets to be identified with a very high degree of specificity, and with very strong associations with specific payment systems or protocols, such as VISA, MasterCard, Europay, etc. An AID used by an applet 105 can thereby be uniquely identified in a very wide number and types of ways, including in specific and unique ways for each transaction generated by a device incorporating such an applet 105. This can be accomplished, for example, by using AIDs associated with card specifications such as MasterCard (A0000000041010) and VISA (A0000000031010), as well as others such as Interac mFlash. As an applet 105 presents itself to the remote POS terminal 112 as an authenticated payment instrument, the applet can be interrogated by the POS terminal 112 as if it is an authentic SIM/secure element payment application. The applet 105 can then be responsible for delivering the particular transactional data that is stored within its secure cache(s) 137 that it received from the mobile app 104, and which the mobile app 104 received from networked servers 110, 120, 220, etc., in the cloud 250.

Specific example specifications suitable for use in implementing applets 105, and advantages provided thereby, include:

1. Operational capability with the use of less than 10 kilobytes of memory 106, 116 on a user device 102, 202, etc.
2. Can be written in JavaCard and/or other commonly-used and available code, and compiled to run on any SE (embedded or SIM) 106, 116.
3. Can be configured to generate transaction data sets interpretable by POS 112 interrogator as compatible with any desired specific payment processors, including for example current, commonly-known systems MasterCard, VISA, by means of suitable AIDs:
   AO 00 00 00 04 10 10 (MC)
   AO 00 00 00 03 10 10 (VISA)
4. Can identify itself to internal systems on devices 102 with unique control AIDs, such as: "XXXXXXXXXX"
5. Can comprise sufficient memory(ies) 137, etc., to be used to for storage of cached transaction data to be used with a POS (outside interrogator) transaction i.e. the responses that the reader needs for Select AID, GPO, Compute Crypto, etc.)
6. A control AID can be used to enable encryption of input data with a device-, user-, and/or application-specific private key 135 and return communications such as store transaction data that can be used by the applet 105 to deliver to the POS 112 when asked (this can be used to validate handset identity, for example).

As will be understood by those skilled in the relevant arts, a trusted service manager (TSM) 120 can act as a neutral or otherwise secure or trusted broker that sets up business agreements and technical connections with mobile network operators, phone manufacturers or other OEMs, and/or other entities controlling the secure element on mobile communication devices such as smart phones, including telcos. A trusted service manager 120 can, for example, enable service providers to distribute and manage their contactless applications remotely by allowing access to the secure element in NFC-enabled handsets.

As will be apparent from all of the disclosure above, token managers such as FI systems 110, 220, 105, 120 and/or other TSMs have the ability to tokenize payment credentials in a wide variety of ways well suited for improving consumer and other users' experience. Identity management and security issues may be enhanced by the ability to tokenize client identification and payment data using any or all of specific device 102, 220, etc., (i.e., mobile device serial number or other identifier), client 10 personal identity (name; social security, driver's license, healthcare card, and/or other identification number(s); birthdate, and/or address, etc.), and account, FI association, and/or other credential eligibility information. As clearly indicated above and in the figures, in preferred embodiments at least three identity characteristics, including for example any or all of: individual user, specific user device, account or other FI information, and/or applet identifier (AID) may be used to maximize security and efficiency of transactions.

These and other possibilities and advantages offered by systems, processes, and instruction sets described by the foregoing, are shown by further specific examples of implementation and use of secure element applets 105 in, for example, a mobile payments context, in FIGS. 11A-11D.

Figure 11A:
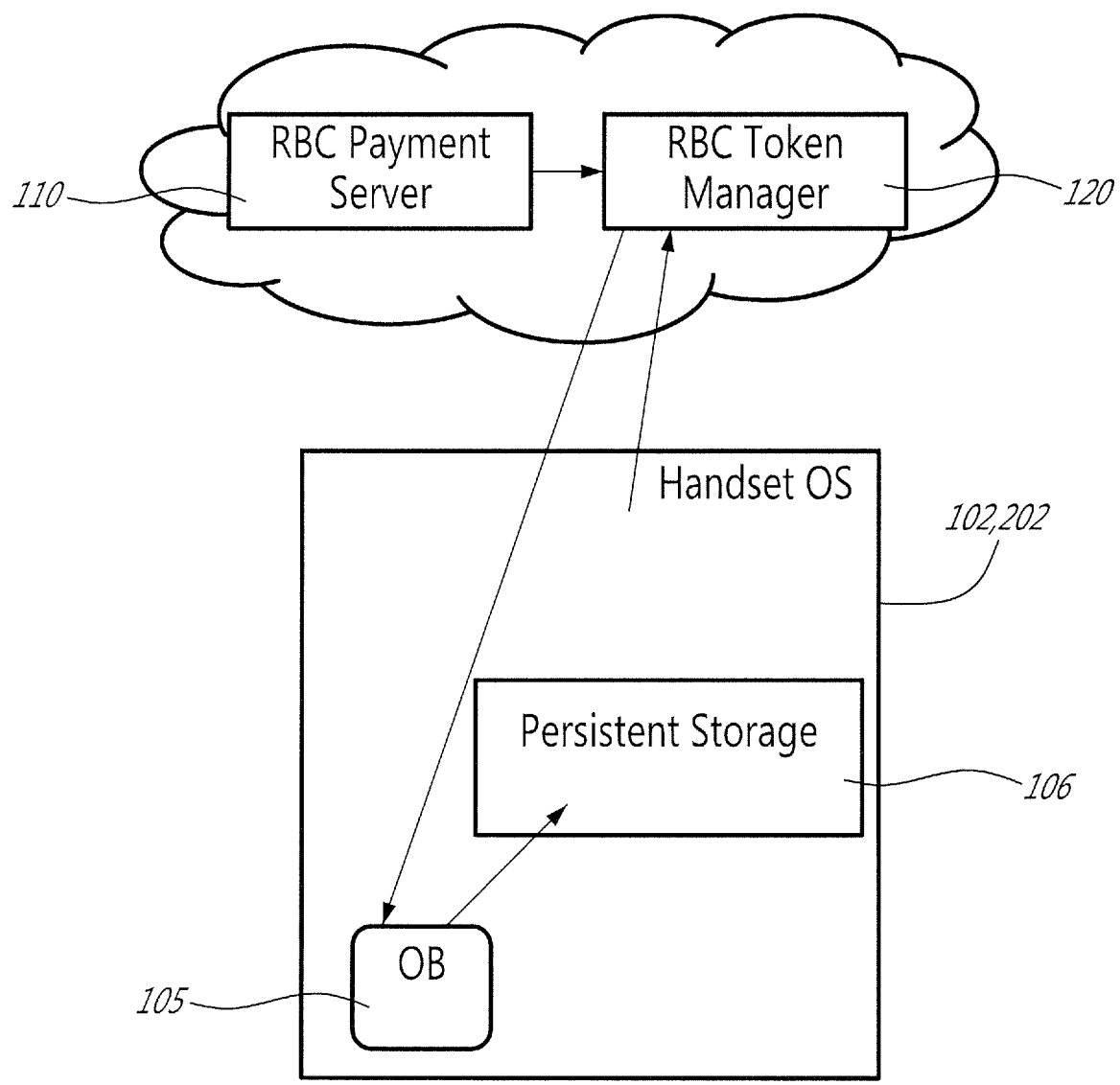

FIG. 11A shows an example of signal/data interactions between a secure element applet 105, an FI server 110 ("RBC Payment Server"), a TSM token manager 120 ("RBC Token Manager") and an operating system of a mobile or other user device 102, 202. At 1, a user 10 of the mobile or other device 102, 202, having accessed a wallet or other account/payment management application 104, requests a payment token for use in a current or future card present or other payment transaction. At 2, the token manager 120, having accessed suitable information 218A, 218B from the FI server 110, generates and provides a secure token data set, including or otherwise associated with suitably-configured encryption key information, to the secure applet 105 on the user device 102, 202, as for example by working through, or in conjunction with, a wallet or other payment management application 104 and suitable wireless or other communications systems on the user device 102, 202. At 3, the token data set provided by the token manager 120 has been decrypted by the olive branch secure applet 105, using a transaction-specific such as a transport key (which can be implemented by using either public and/or private keys such as those disclosed herein), and placed in persistent, preferably secure storage 106, 116 137 on the device 102, 202, for storage until a payment transaction is requested by the user 10.

Figure 11B:
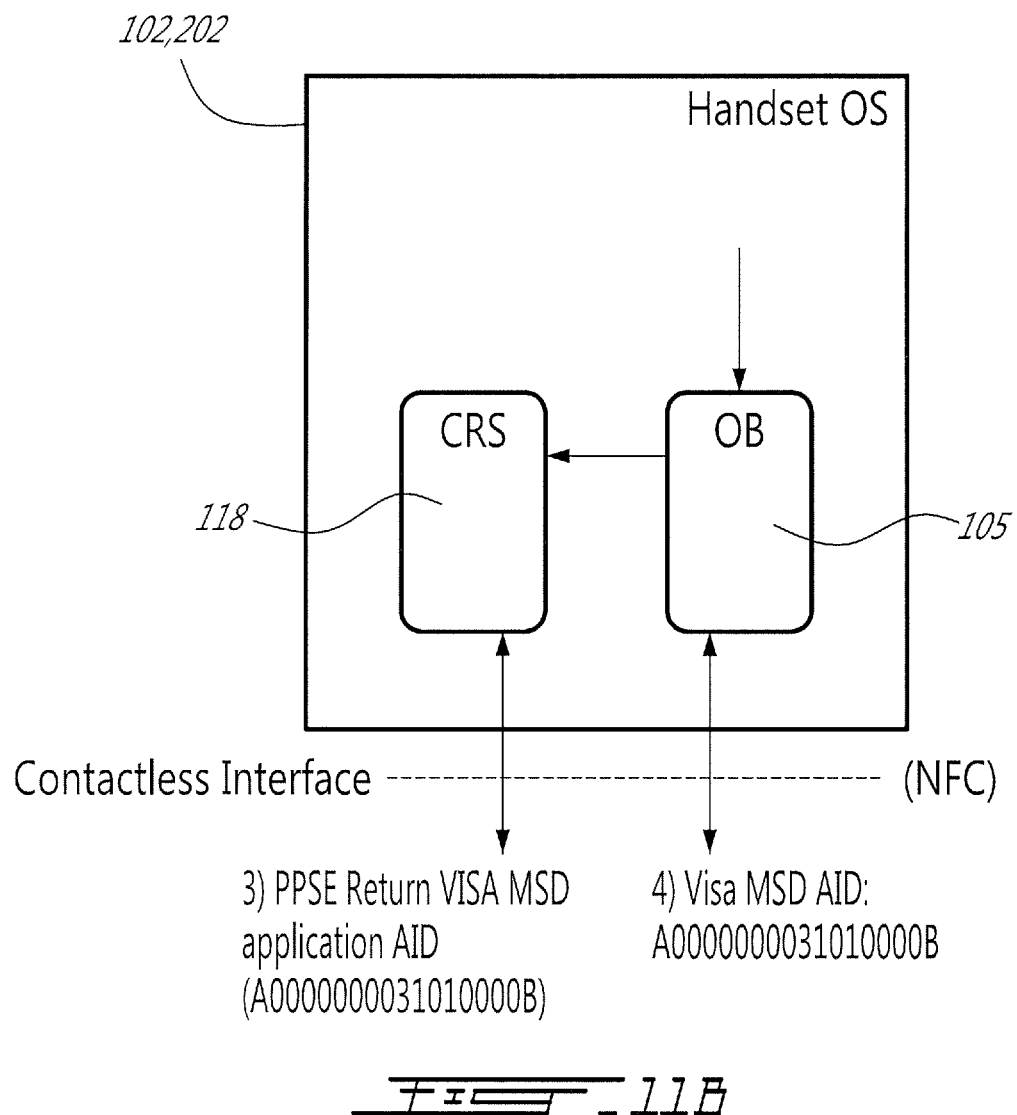

FIG. 11B shows an example of signal/data processes implemented using an Olive Branch secure element applet 105 during a 'real-time' payment transaction, for example in a merchant premises at a point of sale. At 1, the consumer or other user 10, using a wallet or other payment application 104 on a mobile device 202 or user request system 102, selects an account, such as an account associated with a debit, gift, loyalty, and/or credit card held or otherwise administered by an FI 110, 280, etc. Upon such selection the payment application 104 accesses a previously-stored payment token in persistent memory 106 116, 137, etc., which may or may not be located on the mobile device, and makes the token available to the olive branch secure element applet 105, which applet decrypts the token, using a public/private or other storage key, and stages (i.e., translates into a payment system protocol compatible with an FI associated with the selected payment account) the token for delivery to a merchant or other POS 112 upon specific user instruction (e.g., an NFC "tap" or selection of a suitably-configured GUI element on a payment application screen). For example, the secure element applet loads a VISA MSD—compatible token in an AID format such as that described above, using java script JSR-177 processes.

At 2, with the token loaded and suitably staged, the olive branch secure element applet 105 writes to a card registry service (CRS) 106, 118 signal(s) suitable for notifying the CRS 106, 118 of a desired signal processing priority to be assigned to processes initiated or otherwise controlled by the secure element applet in connection with the payment transaction, during for example proximity payment system environment (PPSE) processes, such as NFC communications processes at the POS 112.

At 3, the merchant POS terminal system 112 enters a suitably-configured PPSE state, and is directed to the Olive Branch secure element application 105 by the CRS 106, 118. For example, the merchant POS terminal can confirm transfer by the CRS 106, 118 of a suitably-configured VISA MSD application AID, as described above.

At 4, the merchant terminal 112, using information provided in the secure, staged token, initiates a transaction communication process with the user handset 102, 202, including the Olive Branch secure element applet (105 as shown for example at steps 14-17 in FIG. 8).

Figure 11C:
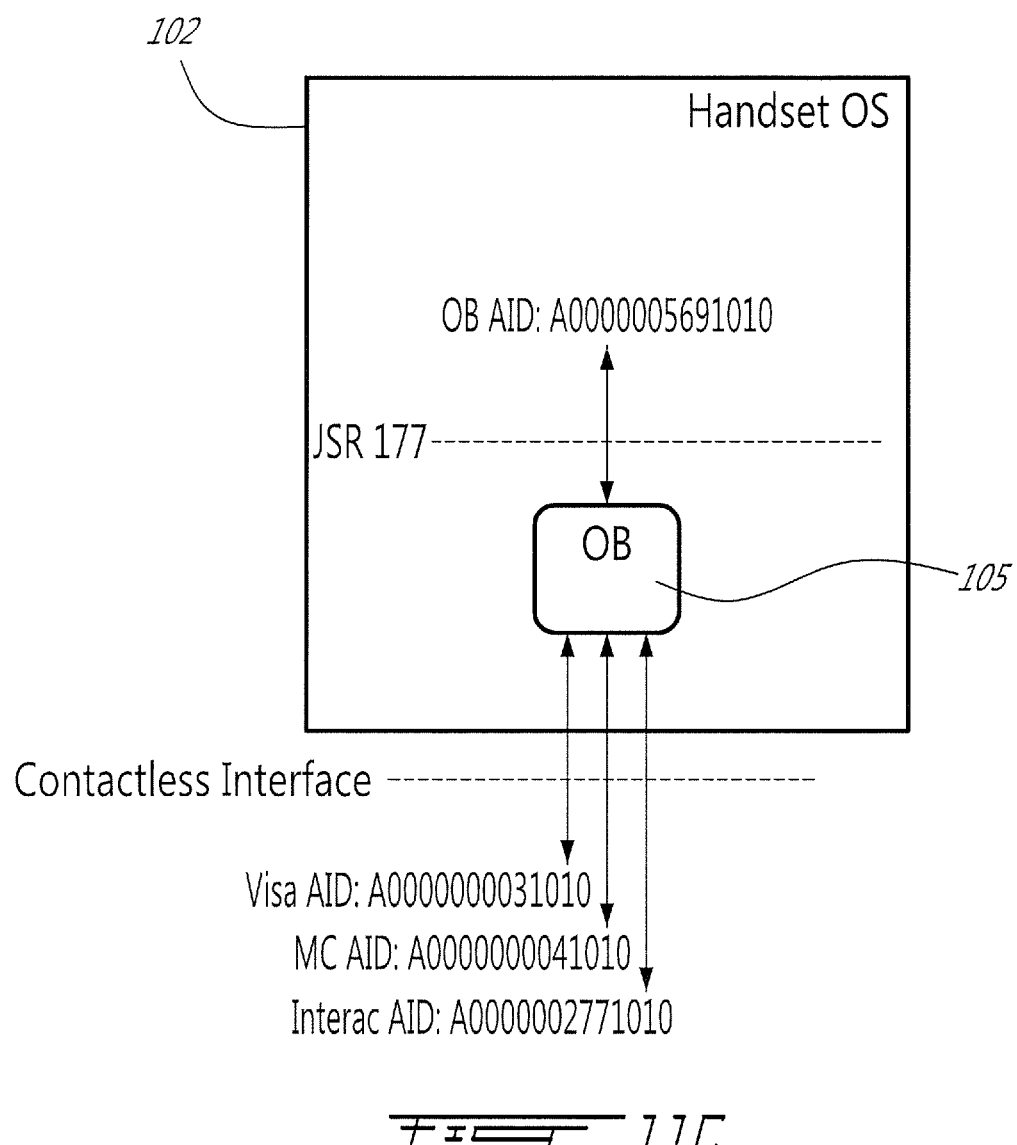

FIG. 11C shows an example of signal/data interactions between an Olive Branch secure element applet 105 and an operating system of a mobile or other transaction communication device 102. In the embodiment shown, such applet 105 is provided as a part of a Javacard package comprising 4 distinct applets 105: an applet which is configured to provide tokenization and/or other encryption services as described herein, and separate applets 105, 118, 220A-D, "VISA shell," "MC shell," and "Interac Shell" adapted to provide protocol/data formatting and other processing for use of Olive Branch payment tokens in conjunction with a variety of distinct payment systems or protocols. All such applets are enabled, by Olive Branch 105, wallet 104, and other applications to share data with one another and to operate within any desired FI SSD(s) ("RBC SSD"). The application package can be provided in approximately 2.5 kilobytes of data, and can allocate a further 3 kilobytes for storage of tokens as described herein. As shown, the Olive Branch secure element applet 105 set can provide suitably-configured tokens for use in payment transactions by formatting and/or otherwise translating a user-unique, device-unique, and FI-unique Olive Branch AID "A0000005691010" into any one or more desired payment-suitable identifiers, such as, in the example shown, VISA AID: A0000000031010
MC AID: A0000000041010
Interac AID: A0000002771010

FIG. 11D shows that the Olive Branch secure element applet 105 can be configured to provide to the CRS one or more payment tokens configured to any one or more desired payment system protocols, as for example described above.

FIG. 12 provides an example of a JSR-177 script suitable for use in implementing AID communication processes between an olive branch secure element and a wallet or other payment application.

In various implementations of secure element applets in accordance with the disclosure, sensitive data may be stored in enciphered and/or hashed form within such tokens, in Secure Element(s) 106, and retrieved for transaction processing by Olive Branch applets 105 implemented on the users' mobile or other devices, 102, 202, etc., operating for example in conjunction with handset wallet software application(s) 104 interacting with standard and/or special purpose user device operating system or special-purpose application interfaces.

Cryptographic services described herein may be of any suitable form, including for example commonly-available current processing capabilities implemented by server(s) 110, 120, 220, etc., and associated HSM(s) 416. HSM(s) can protect all the cryptographic processes and associated keys.

As will be understood by those skilled in the relevant arts, OAuth is an example of an open standard for authorization. OAuth can enable clients to access server resources on behalf of a resource owner (such as a different client or an end-user). It can also provide a process for end-users to authorize third-party access to their server resources without sharing their credentials (typically, a username and password pair), using user-agent redirections.

While the disclosure has been provided and illustrated in connection with various specific embodiments, many variations, combinations, and modifications of elements of the systems and processes shown may be may be made without departing from the scope of the inventive disclosure provided herein.

As a specific example, the disclosure and invention(s) described herein comprise a wide variety of types and forms of systems, components, and devices, which may be interconnected and used in a wide variety of different ways, which in many cases may be made to be equivalent to each other. The disclosure and invention(s) described herein are therefore not to be limited to the exact components, or combinations of components, or details of any methodology(ies) and/or construction(s) set forth above. Rather, such components and details may in many cases be modified and interchanged in a wide variety of ways to accomplish similar or equivalent results, without departing from the scope of the disclosed invention(s). Thus, except to the extent necessary or inherent in the systems, devices, and processes themselves, no particular order to steps, stages, or other components of methods, processes, systems or devices described in this disclosure, including the Figures, is intended or implied. In many cases the order of process steps may be varied without changing the purpose, effect, or import of the methods described.

The scope of the invention is to be defined solely by the appended claims, giving due consideration to applicable rules of construction, such as the doctrine of equivalents and related doctrines.

What is claimed is:

1. A mobile communication device comprising:
   at least one wireless communication system;
   at least one data processor; and
   at least one persistent memory device, the at least one persistent memory device comprising stored data representing at least:
   at least one secure identification token, the at least one secure identification token comprising data associated with the mobile communication device, a user of the mobile communication device, and an account identifier associated with the user of the mobile communication device;
   at least one authorization data set comprising data representing data known only to the payment service provider and the mobile communication device, said at least one authorization data set corresponding to a copy stored at a tokenization engine associated with the payment service provider; and
   one or more sets of machine-interpretable instructions;
   the at least one data processor adapted, by execution of the one or more sets of stored, machine-interpretable instructions, to:
   receive transaction information from a vendor point-of-sale (POS) device, the transaction information including a purchase amount;
   access the at least one authorization data set;
   configure the at least one secure identification token to comprise:
   data from the at least one authorization data set; and
   the purchase amount;
   send the configured identification token to a transaction adjudication device;
   receive a secure payment token from the transaction adjudication device, the secure payment token comprising data associated with an authorized payment amount and a financial service provider identifier;
   send the secure payment token to the vendor POS device; and
   receive confirmation that the transaction is complete.

2. The mobile communication device of claim 1, wherein the at least one authorization data set comprises data representing at least one identifier designated by a user of the mobile communication device.

3. The mobile communication device of claim 2, wherein the at least one identifier designated by a user of the mobile communication device is designated by the user using an input system of the mobile communication device.

4. The mobile communication device of claim 1, wherein the at least one authorization data set comprises data representing at least one identifier designated by a user of the mobile communication device at the time the at least one identification token is configured.

5. The mobile communication device of claim 1, wherein the data associated with the authorized payment amount represents an authorized transaction amount.

6. The mobile communication device of claim 1, wherein the data associated with the authorized payment amount represents a resource locator usable by the transaction adjudication device to access data associated with an authorized transaction value.

7. The mobile communication device of claim 6, wherein the resource locator is associated with at least one of:
  a memory of a server of the financial services provider that authorized the authorized payment amount; or
  a transaction adjudication server of the transaction adjudication device.

8. A network communication device comprising:
  at least one network communication system;
  at least one data processor; and
  at least one persistent memory device, the at least one persistent memory device comprising stored data representing at least:
    at least one secure identification token, the at least one secure identification token comprising data associated with the network communication device, a user of the network communication device, and an account identifier associated with the user of the network communication device;
    at least one authorization data set comprising data representing data known only to the payment service provider and the network communication device, said at least one authorization data set corresponding to a copy stored at a tokenization engine associated with the payment service provider; and
    one or more sets of machine-interpretable instructions;
  the at least one data processor adapted, by execution of the one or more sets of stored, machine-interpretable instructions, to:
    receive transaction information from a vendor point-of-sale (POS) device, the transaction information including a purchase amount;
    access the at least one authorization data set;
    configure the at least one secure identification token to comprise:
      data from the at least one authorization data set; and
      the purchase amount;
    send the configured identification token to a transaction adjudication device;
    receive a secure payment token from the transaction adjudication device, the secure payment token comprising data associated with an authorized payment amount and a financial service provider identifier;
    send the secure payment token to the vendor POS device; and
    receive confirmation that the transaction is complete.

9. The network communication device of claim 8, wherein the at least one authorization data set comprises data representing at least one identifier designated by a user of the network communication device.

10. The network communication device of claim 9, wherein the at least one identifier designated by a user of the network communication device is designated by the user using an input system of the network communication device.

11. The network communication device of claim 8, wherein the at least one authorization data set comprises data representing at least one identifier designated by a user of the network communication device at the time the at least one identification token is configured.

12. The network communication device of claim 1, wherein the data associated with the authorized payment amount represents an authorized transaction amount.

13. The network communication device of claim 8, wherein the data associated with the authorized payment amount represents a resource locator usable by a transaction adjudication device to access data associated with an authorized transaction value.

14. The network communication device of claim 13, wherein the resource locator is associated with at least one of:
  a memory of a server of the financial services provider that authorized the authorized payment amount; or
  a transaction adjudication server of the transaction adjudication device.

15. A method of processing data pertaining to a financial transaction, the method performed by a processor of a network communication device executing machine-interpretable instructions and comprising:
  accessing, in at least one persistent memory of the network communication device, stored data representing at least:
    at least one secure identification token, the at least one secure identification token comprising data associated with the network communication device, a user of the network communication device, and an account identifier associated with the user of the network communication device;
    at least one authorization data set comprising data representing data known only to the payment service provider and the network communication device, said at least one authorization data set corresponding to a copy stored at a tokenization engine associated with the payment service provider;
  receiving transaction information from a vendor point-of-sale (POS) device, the transaction information including a purchase amount;
  accessing the at least one authorization data set;
  configuring the at least one secure identification token to comprise:
    data from the at least one authorization data set; and
    the purchase amount;
  sending the configured identification token to a transaction adjudication device;
  receiving a secure payment token from the transaction adjudication device, the secure payment token comprising data associated with an authorized payment amount and a financial service provider identifier;
  sending the secure payment token to the vendor POS device; and
  receiving confirmation that the transaction is complete.

16. The method of claim 15, wherein the at least one authorization data set comprises data representing at least one identifier designated by a user of the network communication device.

17. The method of claim 16, wherein the at least one identifier designated by a user of the network communication device is designated by the user using an input system of the network communication device.

18. The method of claim 15, wherein the at least one authorization data set comprises data representing at least one identifier designated by a user of the network communication device at the time the at least one identification token is configured.

19. The method of claim 15, wherein the data associated with the authorized payment amount represents an authorized transaction amount.

20. The method of claim 15, wherein the data associated with the authorized transaction amount represents a resource locator usable by a transaction adjudication device to access data associated with an authorized transaction value.

21. The method of claim 20, wherein the resource locator is associated with at least one of:
- a memory of a server of the financial services provider that authorized the authorized transaction amount; or
- a transaction adjudication server of the transaction adjudication device.

* * * * *